US010327112B2

(12) United States Patent
Fjelberg et al.

(10) Patent No.: US 10,327,112 B2
(45) Date of Patent: Jun. 18, 2019

(54) METHOD AND SYSTEM FOR GROUPING WIRELESS DEVICES IN A COMMUNICATIONS NETWORK

(71) Applicant: TELEFONAKTIEBOLAGET L M ERICSSON (PUBL), Stockholm (SE)

(72) Inventors: Marianne Fjelberg, Stockholm (SE); Rickard Cöster, Hägersten (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 14/855,197

(22) Filed: Sep. 15, 2015

(65) Prior Publication Data

US 2016/0366565 A1     Dec. 15, 2016

Related U.S. Application Data

(60) Provisional application No. 62/174,600, filed on Jun. 12, 2015.

(51) Int. Cl.
| | |
|---|---|
| *H04W 4/00* | (2018.01) |
| *H04W 4/08* | (2009.01) |
| *H04W 8/18* | (2009.01) |
| *H04W 24/02* | (2009.01) |
| *G06N 7/00* | (2006.01) |
| *G06N 20/00* | (2019.01) |

(52) U.S. Cl.
CPC ............. *H04W 4/08* (2013.01); *G06N 7/005* (2013.01); *H04W 8/186* (2013.01); *H04W 24/02* (2013.01); *G06N 20/00* (2019.01)

(58) Field of Classification Search
CPC ....... H04W 4/08; H04W 8/186; G06N 99/005
See application file for complete search history.

(56) References Cited

U.S. PATENT DOCUMENTS

2008/0214198 A1* 9/2008 Chen ................. H04L 1/0026
455/450
2008/0250265 A1* 10/2008 Chang ................. G06F 11/008
714/4.12

(Continued)

OTHER PUBLICATIONS

Paul et al. "Learning Probabilistic Models of Cellular Network Traffic with Applications to Resource Management" IEEE International Symposium on Dynamic Spectrum Access Networks (DYSPAN), 2014, pp. 82-91.

(Continued)

*Primary Examiner* — Pakee Fang
(74) *Attorney, Agent, or Firm* — Rothwell, Figg, Ernst & Manbeck, P.C.

(57) ABSTRACT

There is provided mechanisms for grouping wireless devices of a cell of a communications network. A method is performed by a system in the communications network. The method comprises acquiring user network data for wireless devices in a cell of the communications network and cell network data for the cell. The method comprises determining groups for the wireless devices and assigning each one of the wireless devices to one of the groups using unsupervised machine learning with the user network data and the cell network data as input. The method comprises assigning a wireless device entering the cell to one of the groups using supervised machine learning with user network data of said wireless device and the cell network data as input.

28 Claims, 11 Drawing Sheets

(56) References Cited

U.S. PATENT DOCUMENTS

| | | | | |
|---|---|---|---|---|
| 2012/0011112 A1* | 1/2012 | Bian | ................. | G06F 17/30864 |
| | | | | 707/723 |
| 2013/0100849 A1* | 4/2013 | Szabo | ................. | G06K 9/6267 |
| | | | | 370/253 |
| 2014/0106710 A1* | 4/2014 | Rodriguez | .......... | H04M 1/7253 |
| | | | | 455/411 |
| 2014/0376769 A1* | 12/2014 | Bulan | ................. | G06K 9/00771 |
| | | | | 382/103 |
| 2015/0049634 A1* | 2/2015 | Levchuk | ................. | H04L 41/14 |
| | | | | 370/254 |
| 2015/0133191 A1* | 5/2015 | Raman | ................. | H04L 12/6418 |
| | | | | 455/557 |
| 2016/0057041 A1* | 2/2016 | Gupta | ................. | G06N 99/005 |
| | | | | 706/12 |

OTHER PUBLICATIONS

Martin-Sacristán et al. "Mobile Terminal Session SIR Prediction Method Based on Clustering and Classification Algorithms" IEEE Communications Society, WCNC 2010 proceedings, 5 pages.

Laner et al. "Users in Cells: a Data Traffic Analysis" IEEE Wireless Communications and Networking Conference: Mobile and Wireless Networks, 2012, pp. 3095-3100.

* cited by examiner

METHOD AND SYSTEM FOR GROUPING WIRELESS DEVICES IN A COMMUNICATIONS NETWORK

CROSS REFERENCE TO RELATED APPLICATION(S)

This application claims priority to U.S. Provisional Application No. 62/174,600, filed Jun. 12, 2015, the disclosure of which is incorporated herein in its entirety by reference.

TECHNICAL FIELD

Embodiments presented herein relate to a method, a system, a computer program, and a computer program product for grouping wireless devices of a cell in a communications network.

BACKGROUND

In communications networks, there may be a challenge to obtain good performance and capacity for a given communications protocol, its parameters and the physical environment in which the communications network is deployed.

For example, the exponential increase in cellular data usage due to the market introduction of smartphones is evident, and research suggests the increase will continue its pace. For example, it may be expected that, worldwide, smartphone subscriptions will have more than doubled by 2020, and that 70% of the world's population will have a smartphone. In addition to this, it may be expected that mobile video traffic, which currently may be regarded as bandwidth demanding, will grow by approximately 55% per year from 2014-2020, reaching around 60% of all mobile data traffic by the end of that period. This considerable growth in data traffic entails challenges as well as possibilities for network providers and network operators.

For example, data obtained from network service and usage may be used for useful analysis and prediction of future events related to user behavior. Having this knowledge may facilitate for use of advance applications related to radio resource management (RRM). In short, RRM enables for control of certain parameters, such as transmit power, user allocation and handover criteria. RRM adaption may typically be used for resource optimization and for achieving end-user performance improvements.

Previous work in this area involves the use of clustering techniques. In "Mobile Terminal Session SIR Prediction Method Based on Clustering and Classification Algorithms" by Martín-Sacristán, D. et al in Proceedings of the sixteenth annual international conference on Mobile computing and networking, 2010, an improvement was found when using clustering techniques for data of one dimension compared to generic means, suggesting clustering patterns can be found in this kind of data. Co-clustering can also be used for characterization of user behavior in terms of browsing profiles in a network was made.

In terms of a more statistical approach to analyzing traffic and user behavior, "Users in cells: a data traffic analysis" by Laner, M. et al, in the Proceedings of the Wireless Communications and Networking Conference (WCNC), 2012 proposes an extensive statistical analysis aiming to construct statistical models for data traffic in single cells. It was found that there are differences with regards to throughput between cells in a network. Furthermore, an analysis on subscriber mobility and temporal activity patterns can be performed to find that a small fraction of users create the majority of daily traffic and are mostly sporadic.

Machine learning techniques have been considered as well. In "Learning Probabilistic Models of Cellular Network Traffic with Applications to Resource Management" by Paul, U. et al in In IEEE International Symposium on Dynamic Spectrum Access Networks (DYSPAN), 2014, it was assumed that radio access network node loads can be represented as time sequences of multivariate Gaussian random variables, and modelled as a Gaussian Markov Random Field.

The above proposed mechanisms for utilizing cellular data for improving network properties only have a low utilization of available resources. Hence, there may be network properties that are missed.

Hence, there is still a need for better utilization of cellular data for improving network properties.

SUMMARY

An object of embodiments herein is to provide efficient utilization of available cellular data for improving network properties.

According to a first aspect there is presented a method for grouping wireless devices of a cell of a communications network. The method is performed by a system in the communications network. The method comprises acquiring user network data for wireless devices in a cell of the communications network and cell network data for the cell. The method comprises determining groups for the wireless devices and assigning each one of the wireless devices to one of the groups using unsupervised machine learning with the user network data and the cell network data as input. The method comprises assigning a wireless device entering the cell to one of the groups using supervised machine learning with user network data of said wireless device and the cell network data as input.

Advantageously, this use of cellular data enables network properties on a small scale to be utilized for improving network properties.

Advantageously this enables utilization of network properties on cell level not to be missed when improving network properties.

According to a second aspect there is presented a system for grouping wireless devices of a cell in a communications network. The system comprises processing circuitry. The processing circuitry is configured to cause the system to perform a set of operations. The processing circuitry is configured to cause the system to acquire user network data for wireless devices in a cell of the communications network and cell network data for the cell. The processing circuitry is configured to cause the system to determine groups for the wireless devices and assigning each one of the wireless devices to one of the groups using unsupervised machine learning with the user network data and the cell network data as input. processing circuitry is configured to cause the system to assign a wireless device entering the cell to one of the groups using supervised machine learning with user network data of said wireless device and the cell network data as input.

According to a third aspect there is presented a computer program for grouping wireless devices of a cell in a communications network, the computer program comprising computer program code which, when run on a system, causes the system to perform a method according to the first aspect.

According to a fourth aspect there is presented a computer program product comprising a computer program according to the third aspect and a non-transitory computer readable storage means on which the computer program is stored.

According to a fifth aspect there is presented a system. The system comprises means for acquiring user network data for wireless devices in a cell of a communications network and cell network data for the cell. The system comprises means for determining groups for classifying the wireless devices and assigning each one of the wireless devices to one of the groups using unsupervised machine learning with the user network data and the cell network data as input. The system comprises means for assigning a wireless device entering the cell to one of the groups using supervised machine learning with user network data of said wireless device and the cell network data as input.

According to a sixth aspect there is presented a system for grouping wireless devices of a cell in a communications network. The system comprises processing circuitry. The system comprises a computer program product. The computer program product stores instructions that, when executed by the processing circuitry, causes the system to perform steps, or actions. The instructions cause acquiring of user network data for wireless devices in a cell of the communications network and cell network data for the cell. The instructions cause determination of groups of the wireless devices and cause assignment of each one of the wireless devices to one of the groups using unsupervised machine learning with the user network data and the cell network data as input. The instructions cause assignment of a wireless device entering the cell to one of the groups using supervised machine learning with user network data of said wireless device and the cell network data as input.

It is to be noted that any feature of the first, second, third, fourth, fifth, and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed description, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this will be thorough and complete, and will fully convey the scope of the inventive concept to those skilled in the art. Like numbers refer to like elements throughout the description. Any step or feature illustrated by dashed lines should be regarded as optional.

Figure 1:
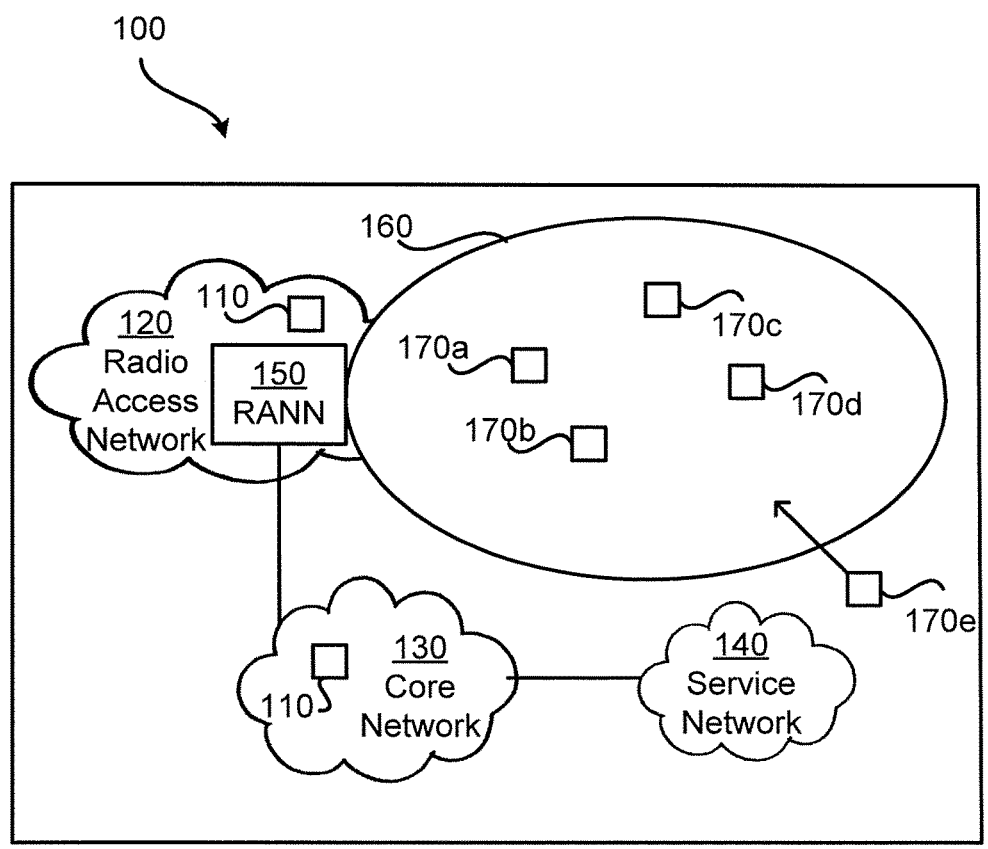
FIG. 1 is a schematic diagram illustrating a communication network according to embodiments.

FIG. 1 is a schematic diagram illustrating a communications network 100 where embodiments presented herein can be applied. The communications network 100 comprises a radio access network node (RANN) 150. The radio access network node provides one or more cells 160 for a wireless device 170a, 170b, 17c, 170d to camp on. The radio access network node 150 is part of a radio access network 120 which may comprise a plurality of such radio access network nodes. The radio access network node 150 is by means of the radio access network 120 operatively connected to a core network 130 which, in turn, is operatively connected to a service network 140. The core network 130 may be operatively connected to a plurality of radio access networks and a plurality of service networks. A wireless a wireless device 170a, 170b, 17c, 170d camping on the cell 160 of the radio access network node 150 may thereby be able to access content and services as provided by the service network 140. Wireless device roe represents a wireless device outside the cell 160, but about to enter the cell 160.

The communications network 100 further comprises at least one system 110. As schematically illustrated in FIG. 1 such a system 110 may be part of the radio access network 120 or the core network 130. However, the system 110 may also be provided outside both the radio access network 120 and the core network 130.

Each radio access network node 150 may be provided as a radio base station, a base transceiver station, a node B, an evolved node B, or an access point (AP). The wireless devices 170a, 170b, 17c, 170d may be provided as a any combination of portable wireless devices such as mobile stations, mobile phones, handsets, wireless local loop phones, a user equipment (UE), smartphones, laptop computers, tablet computers, wireless sensor devices, modems, and dongles.

In view of the above know mechanisms for utilizing cellular data for improving network properties, the herein disclosed mechanisms are based on using higher-dimensional data sets of multiple features, and using different and more advanced clustering techniques. As opposed to evaluating user behavior in terms of browsing profiles, at least some of the herein disclosed embodiments are based on user behavior tied to network characteristics. The results indicate that machine learning techniques such as clustering could improve statistical modelling for each cell.

Although at least some of the above know mechanisms involves analyzing user behavior and network characteristics, most analyses have been performed on 2G networks such as the Global System for Mobile communications (GSM) or 3G networks such as the Universal Mobile Telecommunications System (UMTS), using either simulated or live networks. The analysis presented herein also covers a simulated 4G network, a network which is expected to grow to serve about a large portion of all subscribers (at least in some geographical areas such as Europe and North America) within 5 to 10 years. In general terms, the communications network 100 may be a 2G, 3G, or 4G communications network.

As will be further disclosed below, at least some of the herein disclosed embodiments involve, or enable, prediction of future events (for all wireless devices in a group) tied to, for instance, user load, based on information about a range of features available from a radio access network node 150. To this end, a grouping of wireless devices 170a, 170b, 170c, 170d within a specific cell is performed. This may be achieved by utilizing Gaussian Mixture Models to cluster observations connected to different wireless devices 170a, 170b, 170c, 170d and also evaluating the accuracy of the model parameters. As will be further disclosed below, at least some of the herein disclosed embodiments involves, or enables, mechanism for learning signatures tied to specific clusters with regard to a range of features. At least some of the herein disclosed embodiments involves, or enables, further aspects, such as predicting how long a wireless device will stay in a certain group and what group the wireless device will be in next. This may, for example, involve the use of Markov Chain probabilities for the cluster transitions. Combining these insights with supervised classification, where group identity is used as predictor variable, enables prediction of user behavior within a cell with respect to radio characteristics.

The embodiments disclosed herein thus relate to grouping wireless devices 170a, 170b, 170c, 170d of a cell of a communications network. In order to obtain such grouping there is provided a system no a method performed by the system 110, a computer program 320 comprising code, for example in the form of a computer program product 310, that when run on a system no, causes the system 110 to perform the method.

Figure 2A:
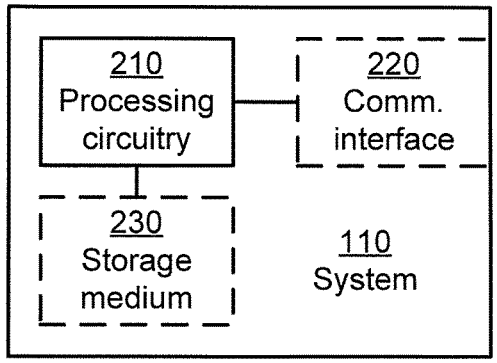
FIG. 2a is a schematic diagram showing functional units of a system according to an embodiment.

FIG. 2a schematically illustrates, in terms of a number of functional units, the components of a system no according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 310 (as in FIG. 3), e.g. in the form of a storage medium 230.

Particularly, the processing circuitry 210 is configured to cause the system no to perform a set of operations, or steps, S102-S122. These operations, or steps, S102-S122 will be disclosed below. For example, the storage medium 230 may store the set of operations, and the processing circuitry 210 may be configured to retrieve the set of operations from the storage medium 230 to cause the system no to perform the set of operations. The set of operations may be provided as a set of executable instructions. Thus the processing circuitry 210 is thereby configured to execute methods as herein disclosed.

The storage medium 230 may also comprise persistent storage, which, for example, can be any single one or combination of magnetic memory, optical memory, solid state memory or even remotely mounted memory. The system no may further comprise a communications interface 220 for communications with other entities, devices, modules, and/or units in the communications network 100. As such the communications interface 220 may comprise one or more transmitters and receivers, comprising analogue and digital components and a suitable number of antennas for wireless communications and ports for wireline communications. The processing circuitry 210 controls the general operation of the system no e.g. by sending data and control signals to the communications interface 220 and the storage medium 230, by receiving data and reports from the communications interface 220, and by retrieving data and instructions from the storage medium 230. Other components, as well as the related functionality, of the system no are omitted in order not to obscure the concepts presented herein.

Figure 2B:
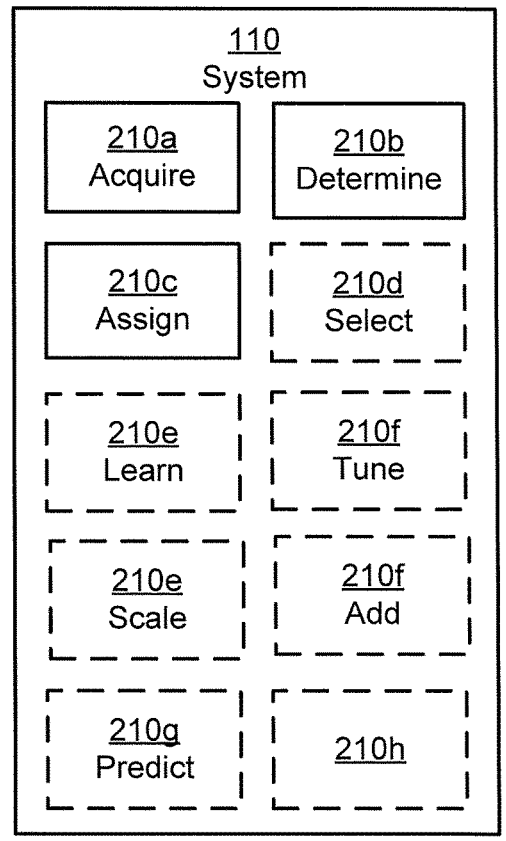
FIG. 2b is a schematic diagram showing functional modules of a system according to an embodiment.

FIG. 2b schematically illustrates, in terms of a number of functional modules, the components of a system no according to an embodiment. The system 110 of FIG. 2b comprises a number of functional modules; an acquire module 210a configured to perform below steps S102, S104, a determine module 210b configured to perform below steps S112, S112a, S112ca, S112cb, S114c, S120, S122, and an assign module 210C configured to perform below step S114, S112c. The system 110 of FIG. 2b may further comprises a number of optional functional modules, such as any of a select module 210d configured to perform below step S112b, a learn module 210e configured to perform below step S114a, a tune module 210f configured to perform below step S114b, a scale module 210e configured to perform below steps S106, S108, an add module 210f configured to perform below step S110, a predict module 210g configured to perform below steps S116, S118, as well as further functional modules 210h. The functionality of each functional module 210a-210g will be further disclosed below in the context of which the functional modules 210a-210g may be used. In general terms, each functional module 210a-210g may in one embodiment be implemented only in hardware or and in another embodiment with the help of software, i.e., the latter embodiment having computer program instructions stored on the storage medium 230 which when run on the processing circuitry makes the system no perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with functional units 220 and/or 230. The processing circuitry 210 may thus be configured to from the storage medium 230 fetch instructions as provided by a functional module 210a-210g and to execute these instructions, thereby performing any steps as will be disclosed hereinafter.

The system 110 may be provided as a standalone device or as a part of at least one further device. For example, the system no may be provided in a node of the radio access network 120 or in a node of the core network 130. Alternatively, functionality of the system 110 may be distributed between at least two devices, or nodes. These at least two nodes, or devices, may either be part of the same network part (such as the radio access network 120 or the core network 130) or may be spread between at least two such network parts. In general terms, instructions that are required to be performed in real time may be performed in a device, or node, operatively closer to the cell 160 than instructions that are not required to be performed in real time. In this respect, at least part of the system 110 may reside in the radio access network 120, such as in the radio access network node 150, for cases when embodiments as disclosed herein are performed in real time, for example where the grouping is used as input to scheduling or power control.

Thus, a first portion of the instructions performed by the system 110 may be executed in a first device, and a second portion of the of the instructions performed by the system 110 may be executed in a second device; the herein disclosed embodiments are not limited to any particular number of devices on which the instructions performed by the system 110 may be executed. Hence, the methods according to the herein disclosed embodiments are suitable to be performed by a system no residing in a cloud computational environment. Therefore, although a single processing circuitry 210 is illustrated in FIG. 2a the processing circuitry 210 may be distributed among a plurality of devices, or node. The same applies to the functional modules 210a-210h of FIG. 2b and the computer program 320 of FIG. 3 (see below).

Figure 3:
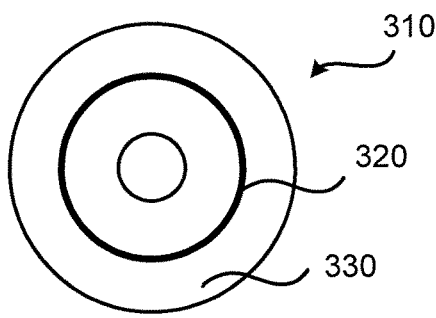
FIG. 3 shows one example of a computer program product comprising computer readable storage means according to an embodiment.

FIG. 3 shows one example of a computer program product 310 comprising computer readable means 330. On this computer readable means 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
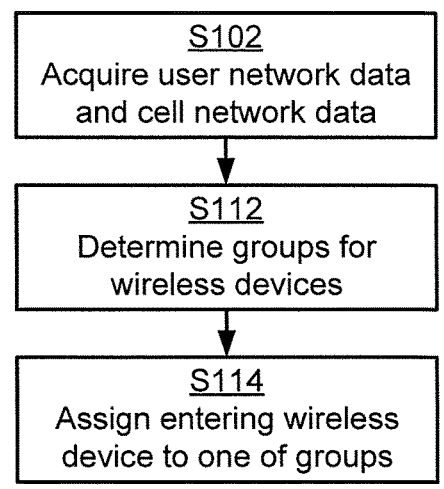
FIGS. 4 and 5 are flowcharts of methods according to embodiments.
Figure 5:
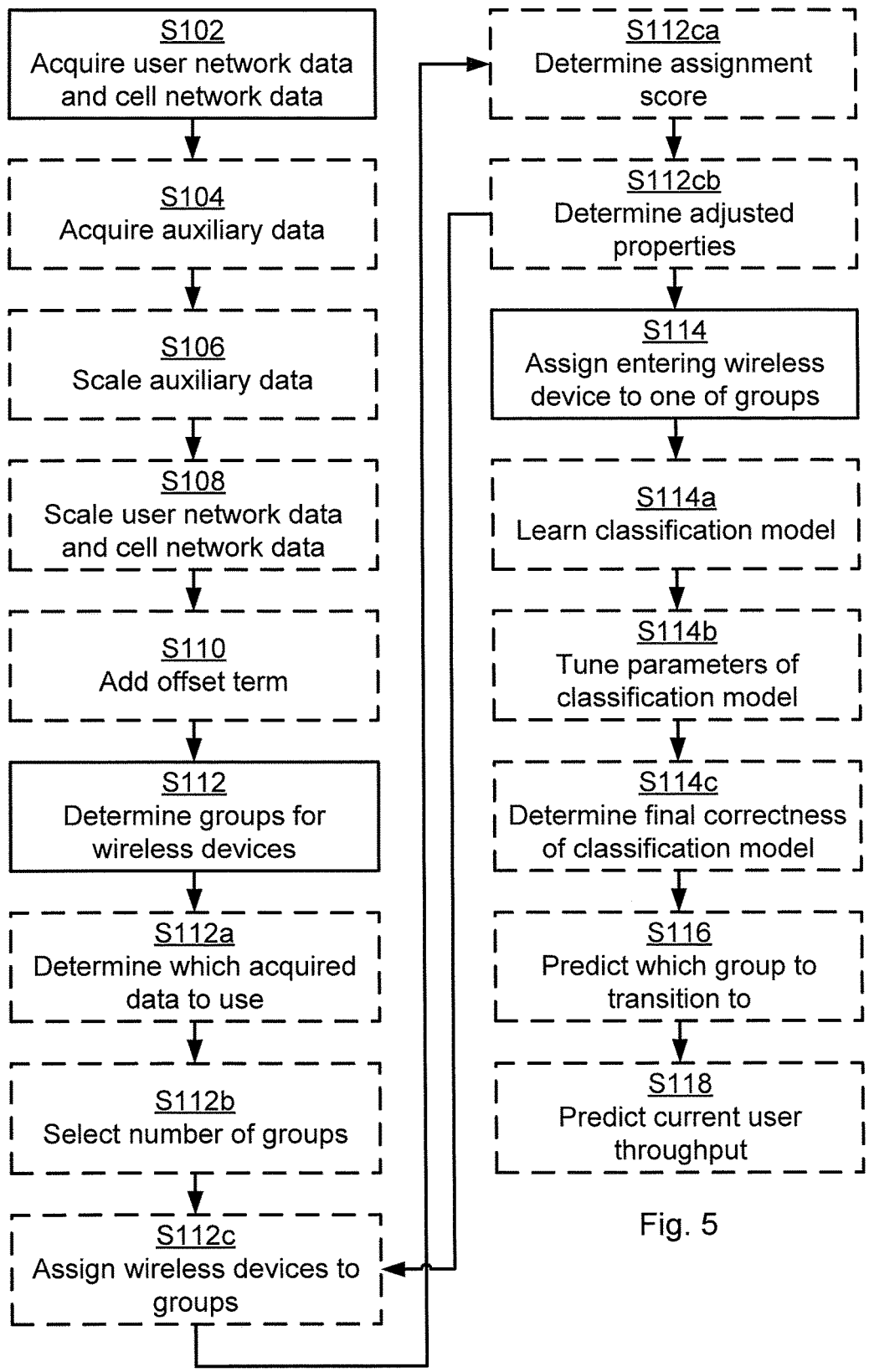

FIGS. 4 and 5 are flow charts illustrating embodiments of methods for grouping wireless devices 170a, 170b, 170c, 170d of a cell 160 of a communications network 100. The methods are performed by the system 110. The methods are advantageously provided as computer programs 320.

In general terms, at least some of the herein disclosed embodiments enables accurate assignment of grouping wireless devices 170a, 170b, 170c, 170d into groups of radio characteristics by using a combination of unsupervised and supervised machine learning. The unsupervised learning, or grouping, may be based on using Gaussian Mixture Models to find the groupings, and the supervised learning may be based on using Random Forest classification to assign wireless devices 170e entering the cell 16 into the correct group.

Reference is now made to FIG. 4 illustrating a method for grouping wireless devices 170a, 170b, 170c, 170d of a cell 160 of a communications network 100 as performed by the system 110 according to an embodiment.

The grouping of the wireless devices 170a, 170b, 170c, 170d is based on data. Hence, the system 110 is configured to acquire such data, as in step S102:

S102: The system 110 is configured to acquire user network data for wireless devices 170a, 170b, 170c, 170d in a cell 160 of the communications network 100. The system 110 is further configured to acquire cell network data for the cell 160. Examples of user network data and cell network data will be provided below. The system 110 may be configured to perform step S102 by the processing circuitry 210 executing functionality of the acquire module 210a. In this respect the acquire module 210a may comprise instructions that when executed by the system 200 causes the processing circuitry 210 to, possible via the communications interface 220, acquire such user network data in order for the system 200 to perform step S102. The computer program 320 and/or computer program product 310 may thus provide means for this step.

Groups may then be determined based on the acquired data, as in step S112:

S112: The system 110 is configured to determine groups for the wireless devices 170a, 170b, 170c, 170d. The groups may be determined so as to enable classification of the wireless devices 170a, 170b, 170c, 170d; hence, the groups may be determined for classifying the wireless devices 170a, 170b, 170c, 170d. The system 110 is further configured to assigning each one of the wireless devices 170a, 170b, 170c, 170d to one of the groups. The assigning is performed by using unsupervised machine learning. The acquired user network data and the cell network data is used as input. Examples of how the system 110 may determine the groups and how each one of the wireless devices 170a, 170b, 170c, 170d may be assigned to one of the groups will be provided below. The system 110 may be configured to perform step S112 by the processing circuitry 210 executing functionality of the determine module 210b. In this respect the determine module 210b may comprise instructions that when executed by the system 200 causes the processing circuitry 210 to determine such groups in order for the system 200 to perform step S112. The computer program 320 and/or computer program product 310 may thus provide means for this step.

These groups, as well as the acquired information, may be used for determining to which group a new wireless device 170e entering the cell 160 should belong to, as in step S114:

S114: The system 110 is configured to assigning a wireless device 170e entering the cell 160 to one of the groups. The assigning is performed using supervised machine learning with user network data of the wireless device 170e and the cell network data as input. The system 110 may be configured to perform step S210c by the processing circuitry 210 executing functionality of the assign module 210c. In this respect the assign module 210c may comprise instructions that when executed by the system 200 causes the processing circuitry 210 to assign the wireless device 170e entering the cell 160 to one of the groups in order for the system 200 to perform step S114. The computer program 320 and/or computer program product 310 may thus provide means for this step.

This method enables fast grouping of wireless devices 170a, 170b, 170c, 170d as well as a first assigning of a wireless device 170e entering the cell 160.

Embodiments relating to further details of grouping wireless devices 170a, 170b, 170c, 170d of a cell of a communications network 100 will now be disclosed.

Reference is now made to FIG. 5 illustrating methods for grouping wireless devices 170a, 170b, 170c, 170d of a cell 160 of a communications network 100 as performed by the system 110 according to further embodiments.

There may be different ways to perform the unsupervised machine learning. According to an embodiment the unsupervised machine learning comprises finding candidate groups describable by a weighted combination of multivariate Gaussian distributions of the user network data and the cell network data.

An embodiment for how to perform the unsupervised machine learning will now be disclosed in steps S112b-S112cb.

S112b: The system 110 may be configured to select a number K of groups. The system 110 may be configured to perform step S112b by the processing circuitry 210 executing functionality of the select module 210a. The computer program 320 and/or computer program product 310 may thus provide means for this step.

S112c: The system 110 may be configured to assign each one of the wireless devices 170a, 170b, 170c, 170d to one of the groups. The system 110 may be configured to perform step S112c by the processing circuitry 210 executing functionality of the assign module 210c. The computer program 320 and/or computer program product 310 may thus provide means for this step.

S112ca: The system 110 may be configured to determine an assignment score for each wireless device for each group. The system 110 may be configured to perform step S112ca by the processing circuitry 210 executing functionality of the determine module 210b. The computer program 320 and/or computer program product 310 may thus provide means for this step.

S112cb: The system 110 may be configured to determine adjusted properties of the groups based on the assignment score. In this respect, the properties may relate to how the groups are defined and how the groups are defined, and may hence, in turn, determine to which group a wireless device is to belong. The system 110 may be configured to perform step S1112cb by the processing circuitry 210 executing functionality of the determine module 210b. The computer program 320 and/or computer program product 310 may thus provide means for this step.

Step S112c may involve performing sub-steps S112ca and S112cb until convergence or for a fixed number of times. In this respect, convergence may be defined as the assignment score for each wireless device for each group changing less than a first threshold value between two consecutive iterations of sub-steps S112ca and S112cb and/or the adjusted properties changing less than a second threshold value between two consecutive iterations of sub-steps S112ca and S112cb.

The number of groups that can naturally cluster the wireless devices 170a, 170b, 170c, 170d in a cell may be found by using a statistical procedure known as gap statistics. That is, gap statistics may be used to find which number of groups to use for classifying the wireless devices 170a, 170b, 170c, 170d.

For the sample data used in experiments as disclosed below, the gap statistics results indicate that there is an optimal number of groups K=5 for all cells. Hence, the wireless devices 170a, 170b, 170c, 170d may, for example, be clustered and/or classified into five groups. This was also confirmed using the so-called Bayesian Information Criterion, indicating that the mechanism for determining the number of groups in the cell is stable across cells.

According to an embodiment, Gaussian Mixture Model (GMM) may be used during the unsupervised learning. According to at least some embodiments, the clustering of wireless devices 170a, 170b, 170c, 170d is thus based on using GMM. Loads of the radio access network nodes may be regarded as time sequences of multivariate Gaussian random variables, and therefore modelled as a Gaussian Markov Random Field.

One of the primary strengths of GMM is the interpretability of the model, i.e., GMM is able to learn a generative model of each group, which enables generation of new data based on the model learned through the GMM modeling. Moreover, as the assignment of groups to observations (in a sso-called E-step, see below) and re-estimation of parameters (in a so-called M-step, see below) is based on probabilistic membership, the assumptions are stronger than for K-means.

While clustering is a mechanism of unsupervised learning, classification is a mechanism of supervised learning, as classification is dependent of having response variables/labels.

According to an embodiment the supervised machine learning is based on constructing at least one decision tree. How to construct such a decision tree is further disclosed below.

In general terms, a classification model is built on a training set of data, and tested on a different set of data called the test set. Once the groups are built, classification can be used to, in real time, assign new wireless devices 170a, 170b, 170c, 170d to the correct group.

An embodiment for how to perform the supervised machine learning will now be disclosed in steps S114a-S114c.

S114a: The system 110 may be configured to learn a machine learning multi-class classification model using a training set of data to map the user network data to the correct group. The system 110 may be configured to perform step S114a by the processing circuitry 210 executing functionality of the learn module 210e. The computer program 320 and/or computer program product 310 may thus provide means for this step.

S114b: The system 110 may be configured to tune parameters of the machine learning model using a validation set of data. The system 110 may be configured to perform step S114b by the processing circuitry 210 executing functionality of the tune module 210f. The computer program 320 and/or computer program product 310 may thus provide means for this step.

S114c: The system 110 may be configured to determine a final correctness of the machine learning model using a testing set of data. The system 110 may be configured to perform step S114c by the processing circuitry 210 executing functionality of the determine module 210b. The computer program 320 and/or computer program product 310 may thus provide means for this step.

According to an embodiment, Random Forest classification is used during the supervised learning.

Table 2 represents a so called confusion matrix showing the results of the classification applied to experimental data using Random Forest as classification method. The rows and columns are group indexes for Reference and Prediction, respectively, where the Reference (Ref.) is the true group belonging and the Prediction (Pred.) is the predicted group belonging for each wireless device in the experiment. It is evident from Table 2 that the classification accurately predicts the correct group for new unseen data (i.e., user network parameter values of new wireless devices 170a, 170b, 170c, 170d).

TABLE 2

Confusion matrix for experimental data.

|  | Ref. 1 | Ref. 2 | Ref. 3 | Ref. 4 | Ref. 5 |
|---|---|---|---|---|---|
| Pred. 1 | 9094 | 15 | 39 | 0 | 6 |
| Pred. 2 | 84 | 18579 | 94 | 79 | 3 |
| Pred. 3 | 78 | 98 | 18354 | 25 | 0 |
| Pred. 4 | 0 | 87 | 31 | 32704 | 102 |
| Pred. 5 | 10 | 0 | 0 | 53 | 20465 |

Each group may represent a unique set of radio characteristics values. These sets of radio characteristics values may be based on the user network data and the cell network data.

There may be different examples of user network data and cell network data.

Examples of user network data comprises current user throughput, previous user throughput, channel quality indicator (CQI), rank, handover information, time to handover, or any combination thereof.

Examples of cell network data comprises cell throughput, number of active wireless devices 170a, 170b, 170c, 170d in the cell, number of wireless devices 170a, 170b, 170c, 170d in queue of the cell, or any combination thereof. In this respect, any wireless devices 170a, 170b, 170c, 170d in queue of the cell may be defined by wireless devices 170a, 170b, 170c, 170d waiting to be served by the cell.

Information regarding handover from one cell to another cell in the communications network is often available in a radio access network node. The average time remaining until a handover occurs for a wireless device in the cell is denoted time to handover. As is clear from the above, different wireless devices 170a, 170b, 170c, 170d may enter the cell at different times. Hence, although the cell is associated with only one value of the time to handover, wireless devices 170a, 170b, 170c, 170d may therefore also exit the cell at different times.

In a communications networks, throughput is defined as the rate of successful message delivery over a communication channel. Throughput is commonly measured in bits per second (bits/s). Information regarding user throughput, i.e., the throughput for an individual wireless device, and/or the cell throughput, i.e., the total throughput for all wireless device currently in the cell, may be considered.

A radio access network node may log information regarding the number of active wireless devices 170a, 170b, 170c, 170d per cell. Furthermore, a radio access network node may log information regarding the number of wireless devices 170a, 170b, 170c, 170d in a queue to a particular cell, that is, the number of wireless devices 170a, 170b, 170c, 170d currently awaiting a connection to that particular cell.

The Channel Quality Indicator (CQI) is, as implicated by the name, an indicator of the quality of the communication channel. The CQI is measured by the wireless devices 170a, 170b, 170c, 170d and may, for example, be measured in terms of signal-to-noise ratio (SNR), signal-to-interference plus noise ratio (SINR), or signal-to-noise plus distortion ratio (SNDR). The CQI may be represented by an ordinal value, such as a value in the range $\{1, 2, \ldots, Q\}$, where 1 denotes the poorest channel quality and Q the best channel quality. However, also other representations of the CQI are possible within the scope of the herein disclosed embodiments.

Further, additional data may be used in addition to the user network data parameters and the cell network data parameters for determining the groups as in step S112 and/or for assigning the entering wireless device 170e to one of the groups as in step S114. Therefore the system 110 may be configured to acquire auxiliary data, as in step S104:

S104: The system 110 may be configured to acquire auxiliary data such as time indication, wireless device identity information, wireless device group information, wireless device velocity information, speed information, radio access network node information, cell information, position information, or any combination thereof. In this respect, the term velocity information may be interpreted as encompassing speed information, possible together with directional information of the wireless devices 170a, 170b, 170c, 170d (if available). The system 110 may be configured to perform step S104 by the processing circuitry 210 executing functionality of the acquire module 210a. The computer program 320 and/or computer program product 310 may thus provide means for this step.

Table 1 gives an overview of user network data parameters, cell network data parameters, and auxiliary data parameters and how the parameters may be represented.

TABLE 1

Overview of user network data parameters, cell network data parameters, and auxiliary data parameters.

| User network data parameters: | |
|---|---|
| Current user throughput | Representation |
| Previous user throughput | Continuous |
| CQI | Continuous |
| Rank | Discrete |
| Handover | Discrete |
| Time to handover | Logical |
| | Continuous |
| Cell network data parameters: | |
| Cell throughput | Continuous |
| Number of active wireless devices 170a, 170b, 170c, 170d | Discrete |
| Number of wireless devices 170a, 170b, 170c, 170d in queue | Discrete |
| Auxiliary data parameters: | |
| Wireless device | Discrete |
| Wireless device group | Discrete |
| Velocity | Continuous |
| Radio access network node | Discrete |

TABLE 1-continued

Overview of user network data parameters, cell network
data parameters, and auxiliary data parameters.

| Cell | Discrete |
|---|---|
| Position | Continuous |

There may be different ways to utilize the grouping determined in step S112 and/or the assigning performed in step S114. For example, the grouping may be utilized for prediction purposes. Different examples relating thereto will now be disclosed.

A first example of prediction relates to transitions of wireless devices 170a, 170b, 170c, 170d from one group to another, as in step S116:

S116: The system 110 may be configured to predict, for wireless devices 170a, 170b, 170c, 170d of one of the groups, into which other group the wireless devices 170a, 170b, 170c, 170d of this one of the groups are most likely to enter. The information regarding which group the wireless device is likely to be in next can be evaluated using Markov Chains, and investigating the K×K transition matrix of the clusters in the cell in which the wireless device currently is located. Hence, Markov Chains may be used during the predicting in step S116. The system 110 may be configured to perform step S116 by the processing circuitry 210 executing functionality of the predict module 210g. The computer program 320 and/or computer program product 310 may thus provide means for this step.

User throughput is not always known at all times since the wireless devices 170a, 170b, 170c, 170d may not always transmit data. If the grouping in step S112 is performed without incorporating user throughput as input, different groups may still have different user throughout distributions. In order to predict user throughout, throughput data is acquired when available, and then the grouping may be performed without this information. Then for each group the distribution of throughput may be assigned to each group from the acquired throughput data we, and that assigned distribution may be used when predicting the user throughput. A second example of prediction therefore relates to load prediction, as in step S118.

S118: The system 110 may be configured to, if current user throughput is excluded from the user network data, predict current user throughput for wireless devices 170a, 170b, 170c, 170d of one of the groups. This could be an application for RRM purposes. The system 110 may be configured to perform step S118 by the processing circuitry 210 executing functionality of the predict module 210g. The computer program 320 and/or computer program product 310 may thus provide means for this step.

Figure 14:
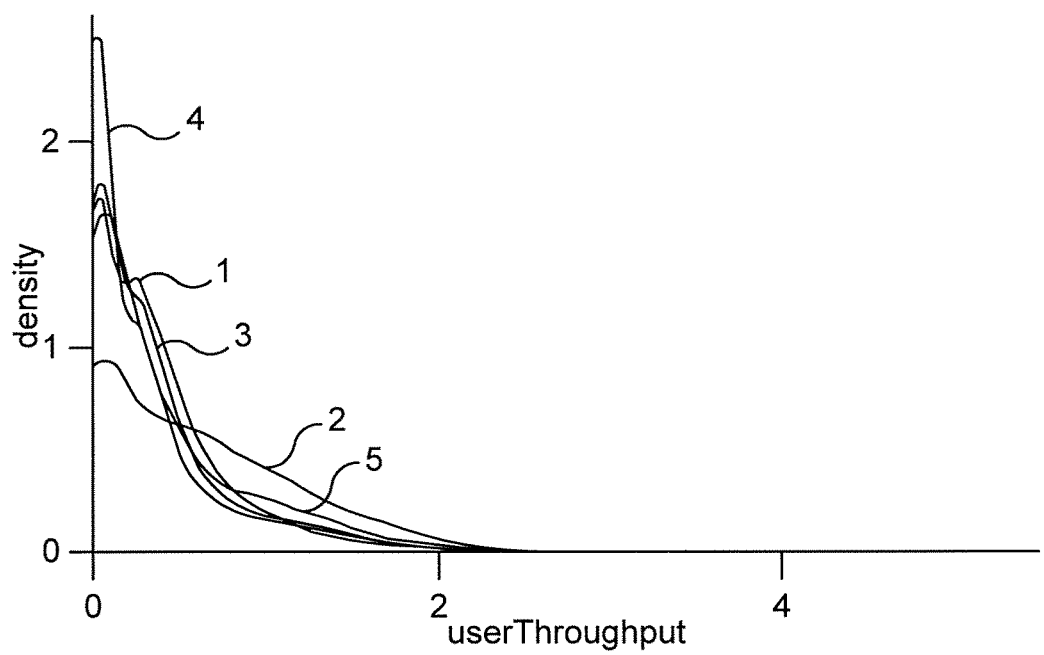
FIG. 14 schematically illustrates density as a function of user throughput.

A graphical representation of the density of user throughput for each of the assigned clusters for once cell is shown in FIG. 14. FIG. 14 illustrates the density of user throughput for every group in a cell, assigned without the help of user throughput. It can be observed from this figure that the distribution of user throughput differs amongst the group even though the parameter is not used in the grouping. Moreover, wireless devices 170a, 170b, 170c, 170d with typically higher load demands may be identified, as can be observed by "group 1". This could serve as valuable information for RRM.

A third example of prediction relates to load balancing, as in step S120.

S120: The system 110 may be configured to determine a load balancing action for wireless devices 170a, 170b, 170c, 170d of one of the groups with the user network data as input. Load balancing may be achieved by performing a load balancing action. The load balancing may relate to the current load of each wireless device 170a, 170b, 170c, 170d and/or the predicted future load of each wireless device 170a, 170b, 170c, 170d. Information from the performed grouping, for example how the wireless devices 170a, 170b, 170c, 170d are distributed in the different groups and how are the wireless devices 170a, 170b, 170c, 170d are moving between groups in the cell and across cells may be used as input to determination of the load balancing action.

A fourth example of prediction relates to carrier aggregation, as in step S122.

S122: The system 110 may be configured to determine whether to perform carrier aggregation for wireless devices 170a, 170b, 170c, 170d of one of the groups with the user network data as input. The carrier aggregation may consider whether or not to use multiple carriers, possibly enabling higher throughput. Determination of carrier aggregation may be based on what group a wireless device 170a, 170b, 170c, 170d is located in, what the expected transitions are and what the predicted throughput is. If the probability for transition from one group to another is high (compared to the probability for transition from other groups) or if the wireless device is part of a group having low throughput (compared to the throughput of other groups) then carrier aggregation may be up-prioritized for that wireless device relative to other wireless devices. If the wireless device is in a group having high throughput (compared to the throughput of other groups) but does not have a high demand for high throughput then carrier aggregation may be down-prioritized for that wireless device relative to other wireless devices.

Both the third example and the fourth example are coupled with extra information about what actual amount of data the wireless device 170a, 170b, 170c, 170d is sending and receiving, and optionally what service or services the wireless device 170a, 170b, 170c, 170d is running.

Since GMM can terminate at a local optimum, some kind of initialization of the input parameters to the GMM may be performed.

According to one embodiment d=5 parameters are used for the grouping. According to one embodiment these 5 parameters, which typically are made available by a radio access network node, are: {wireless device throughput, CQI, time to handover, cell throughput, number of active wireless devices 170a, 170b, 170c, 170d}.

One way to perform initialization of the input parameters is to determine which of the acquired data to use as input parameters, as in step S112.

S112a: The system 110 may be configured to determine which user network data and which cell network data to use for classifying the wireless devices 170a, 170b, 170c, 170d and assigning said each one of the wireless devices 170a, 170b, 170c, 170d to one of the groups. The system 110 may be configured to perform step S112a by the processing circuitry 210 executing functionality of the determine module 210b. The computer program 320 and/or computer program product 310 may thus provide means for this step.

There may be still further different ways to perform initialization of the input parameters. For example, as the magnitude of the values of different data parameters may differ, scaling may be used to normalize the values in order to allow for equal impact on the grouping. Scaling of the acquired data may therefore be performed as in any of steps S106 and S108:

S106: The system 110 may be configured to, if auxiliary data has been acquired, scale the auxiliary data so as to normalize all values of the auxiliary data. The system 110 may be configured to perform step S106 by the processing circuitry 210 executing functionality of the scale module 210e. The computer program 320 and/or computer program product 310 may thus provide means for this step.

S106: The system 110 may be configured to scale the user network data and the cell network data so as to normalize all values of the user network data and the cell network data. The system 110 may be configured to perform step S106 by the processing circuitry 210 executing functionality of the scale module 210e. The computer program 320 and/or computer program product 310 may thus provide means for this step.

There may be still further different ways to perform initialization of the input parameters. For example, in order to avoid singular or close-singular covariance matrices $\Sigma k$, an offset, or regularization, value of can be added, as in step S110:

S118: The system 110 may be configured to add an offset value to all normalized values. The regularization value may be in the order $10^{-5}$. The system 110 may be configured to perform step S118 by the processing circuitry 210 executing functionality of the add module 210f. The computer program 320 and/or computer program product 310 may thus provide means for this step.

One specific embodiment for grouping wireless devices 170a, 170b, 170c, 170d of a cell 160 in a communications network too will now be disclosed.

Mathematical Background

Unsupervised machine learning is based on the problem of identifying groups in data without labels in form of a response variable. One tool for this is clustering, which is based on the concept of dividing data into subsets which share a common signature with respect to some features. There have been developed an extensive number of different clustering techniques, some of them falling under the category of partitional clustering, where the number of components (the words groups, components and clusters are used interchangeably in this), denoted k, is pre-specified (as opposed to hierarchical clustering where k is unknown). In this disclosure, one clustering method based on centroid models (K-means) and one based on distribution models (Gaussian Mixture Models) are considered.

Naturally, finding the optimal number k, as the smallest K that describes the model satisfactory in order to avoid overfitting, is one task for these clustering methods. Overfitting leads to problems where the data fits the model so well that it will be problematic to fit other data to the model, because minor variations due to noise in data are included in the model, mistaken to be true signals of the underlying relationship in the data.

Gaussian Mixture Models

Mixture distributions are useful in modelling of heterogeneity in a cluster analysis. It has been demonstrated that with n=10 000 observations, a mixture of around 30 normals is sufficient to produce a good approximation of a log normal density, whilst a mixture of 10 000 normals was required for a kernel density estimator. This is due to the ability of the mixture model to model rather complex distributions when choosing a convenient number of components in order to obtain accurate representations of local areas supporting the true distribution. With this feature, local variations in the observed data are handled whereas a single parametric family would be unable to do so.

A Gaussian Mixture Model, often denoted GMM, is based on a parametric probability density function which is represented as a weighted sum of Gaussian component densities. The model parameters are estimated by utilizing the Expectation-Maximization (EM) algorithm on training data.

For a data set $D=\{x_1, \ldots, x_N\}$, where $x_i$ is a d-dimensional vector of observations, we assume that the points are Independent and identically distributed (IID) and that their underlying density p(x) is defined as a finite mixture model with K components. The parametric probability function is given by $$p(x \mid \lambda) = \sum_{k=1}^{K} w_k g_k\left(x \mid \mu_k, \sum_k\right)$$

where $\lambda=\{w_k, \mu_k, \Sigma_k\}$, k=1, ..., K denotes the parameters of the GMM, namely the mixture weights $w_k$ such that $\Sigma_{k=1}^{K} w_k = 1$, the means $\mu_k$ and covariance matrices $\Sigma_k$. $\Sigma_k$ can be either full rank, constrained or diagonal, and furthermore—the parameters given by $\lambda$ can be shared among the Gaussian components. The $w_k$ indicates weight of densities, hence represents the probability that a randomly selected x was generated by component k. The parameters $\mu_k$ and $\Sigma_k$ describes the density of the d-dimensional continuous-valued data vector of measurements x, which are mathematically represented by the d-variate Gaussian functions $g(x|\mu_k, \Sigma k)$, k=1, ... K of the form $$g_k\left(x \mid \mu_k, \sum_k\right) = \frac{1}{(2\pi)^{d/2}|\Sigma_k|^{1/2}} \exp\left\{-\frac{1}{2}(x-\mu_k)' \sum_k^{-1}(x-\mu_k)\right\}$$

A common method for estimating the parameters $\lambda$ given a sequence N of training vectors $X=\{x_1, \ldots, x_N\}$ and GMM configuration settings, is the maximum-likelihood (ML) estimation. The estimation is carried out by maximizing the likelihood of the GMM given the training data in X. Hence, the following expression is to be maximized:

$$p(X \mid \lambda) = \prod_{i=1}^{N} p(x_i \mid \lambda)$$

with the assumption that the vectors are independent due to the need of making the problem tractable although this assumption actually often is incorrect. Direct maximization of this expression is not possible, but by utilizing the expectation-maximization (EM) algorithm estimates of the ML parameters can be obtained iteratively. This is performed by estimating a new, improved model $\bar{\lambda}$ from an initial model $\lambda$ such that $p(X|\bar{\lambda}) \geq p(X|\lambda)$. By iterating this step until convergence, i.e. when the change in means is small, the model parameters are obtained.

The first step is to make an initialization of parameters, and one approach is to use a result from K-means algorithm to initialize, by letting $$\mu_k, \text{first iteration} \leftarrow \mu_k, K\text{-means}$$

$$\sum_k, \text{first iteration} \leftarrow \text{Cov}(\text{cluster}(K))$$

$$\pi_k, \text{ first iteration} \leftarrow \frac{\text{number of points in } k}{\text{total number of points}}$$

Other approaches for choosing initial parameters are of course possible. Alternatively, a set of initial weights could be used as a starting point and performing the M-step first.

However, assuming we start with a set of initial parameters as provided above, the next step is to perform the E-step. The E-step of the EM-algorithm is performed by determining the assignment score for each point $x_i$ to each Gaussian k, namely computing $$\gamma_{i,k} = \frac{w_k N_d(x_i | \mu_k, \Sigma_k)}{\sum_{j=1}^{K} w_j N_d(x_i | \mu_j, \Sigma_j)} = \frac{w_k g_k(x_i | \mu_k, \Sigma_k)}{\sum_{j=1}^{K} w_j g_j(x_i | \mu_j, \Sigma_j)}$$

for all data points $1 \leq i \leq N$ and mixture components $1 \leq k \leq K$. $\gamma_{i,k}$ is called the responsibility, or membership weights, and describes to what extent this Gaussian i is responsible for this particular point or observation $x_i$. The output of this step is an N×K matrix of responsibilities, with each row sum being equal to 1.

Next is the M-step, where the parameters for each Gaussian k are updated using the new $\gamma_{i,k}$ as given by the expression above. The re-estimation of the components of $\overline{\lambda}$ are performed using the formulas given by below, in that order, on $1 \leq k \leq K$ to ensure a monotonic increase of the likelihood. The derivation can be found at the end of this particular embodiment.

$$\overline{w}_k = \frac{1}{N} \sum_{i=1}^{N} \gamma_{i,k}$$

$$\overline{\mu}_k = \frac{\sum_{i=1}^{N} \gamma_{i,k} \cdot x_i}{\sum_{i=1}^{N} \gamma_{i,k}}$$

$$\overline{\Sigma}_k = \frac{\sum_{i=1}^{N} \gamma_{i,k} \cdot (x_i - \overline{\mu}_k)(x_i - \overline{\mu}_k)'}{\sum_{i=1}^{N} \gamma_{i,k}}$$

As can be observed in the above expressions, the updated means are calculated in a similar manner as for a standard empirical average with the exception of the fractional weight given by the responsibility $\gamma_{i,k}$. Note that the terms do not cancel as this is a vector equation with the d-dimensional vectors $x_i$ and $\overline{\mu}_k$, and as the calculation is rather similar to that of the empirical covariance matrix, but also this one is weighted by $\gamma_{i,k}$. As is evident from these expressions, the parameters that are the best fit for the assignment scores are found in these steps.

For every implementation of the E-step and M-step, one iteration is made. This should be performed until the likelihood or the parameters converge. From above yields that the log-likelihood is defined as $$\log l(\lambda) = \log P(X | \lambda) = \sum_{i=1}^{N} \log p(x_i | \lambda) = \sum_{i=1}^{N} \left( \log \sum_{k=1}^{K} w_k g_k \left( x_i | \mu_k, \Sigma_k \right) \right)$$

The log-likelihood should be computed according to this expression after every iteration, and when convergence is found, the iteration is stopped.

K-Means

The K-means algorithm is a simple variant of the EM algorithm for Gaussian Mixture Models, where it is assumed that the covariance matrices and weights are fixed such that $\Sigma k = Y^2 I$ and $w_k = 1/K$. With these assumptions, the only parameter estimation to be performed is on the cluster centers $\mu_k$.—means is based on the concept of minimizing the "within-cluster sum of squares" (WCSS) for the sets $C = \{C_1, \ldots C_K\}$ given by $$\underset{C}{\arg\min} \sum_{k=1}^{K} \sum_{x \in C_k} \|x - \mu_k\|^2$$

In a similar manner as for the EM-algorithm explained above, K-means uses an iterative refinement approach by starting of with an initial set of K mean values $\mu_k$, i=1, . . . , K, assigning each observation to the nearest mean value $\mu_k$ by minimizing the WCSS given by the above expression. In other words, the observations are assigned according to the Voronoi diagram generated by the current set of means $\mu_k^{(t)}$ as $$C_k^{(t)} = \{x : \|\mu x - \mu_k^{(t)}\|^2 \leq \|\mu x - \mu_j\|^2 \forall j, 1 \leq j \leq K\}$$

Following this step, new means are updated to be the centroids of the observations assigned to the respective cluster:

$$\mu_k^{(t+1)} = \frac{1}{|C_k^{(t)}|} \sum_{x \in C_k^{(t)}} x$$

These steps are repeated until convergence, as for the EM-algorithm explained above.

Environment and Setup

The data set D is of the dimension 21 million rows with features listed in Table 1 above.

The simulation environment is modelled after an American city model with a city center with a high population density, surrounded by a highway and a suburban area with a lower population density. A print of the map is shown in FIG. 7.

Figure 7:
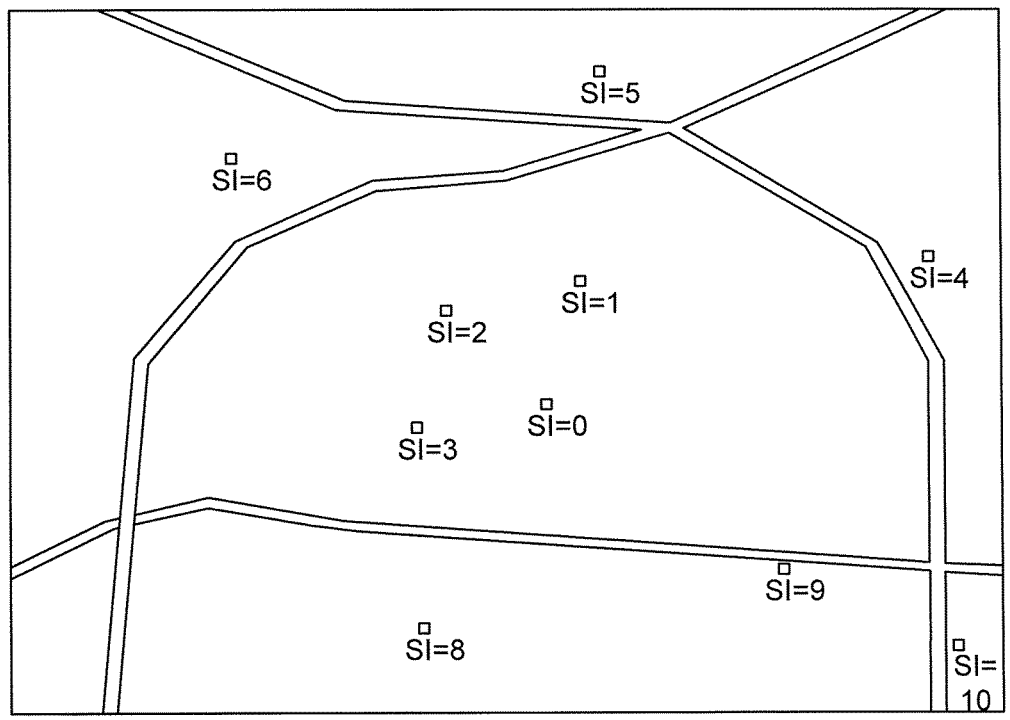
FIG. 7 schematically illustrates a print of the simulated city environment.

The 4G network is a setup of 11 base stations, together covering 33 cells, spatially distributed as in FIG. 7. The data set is a result of a simulation of 60 minutes with a time step of looms. In this data set, each observation corresponds to one of 600 active users for a time step, where all users are continuously downloading 1 MB files (note that voice calls are not performed over 4G networks today, hence the usage is mobile data without voice calls). The wireless devices are distributed amongst 6 typical user groups as in Table 3:

TABLE 3

Wireless devices in simulation

| Amount | Group identity | Description | Velocity |
|---|---|---|---|
| 350 | U0 | Indoor users | — |
| 50 | U1 | Pedestrian user walking outside | 3 km/h |
| 50 | U2 | Car drivers on streets | 30 km/h |
| 50 | U3 | Car drivers on streets | 50 km/h |
| 50 | U4 | Car drivers on highway | 70 km/h |
| 50 | U5 | Car drivers on highway | 90 km/h |

Limitations

Although the simulation tool used is advanced, this simulation makes some limiting assumptions tied to the user generation that should be addressed. Firstly, it is obvious that the assumption that users in a network can be categorized in the simple manner stated in Table 3 is a rather vigorous simplification. However, this disclosure does not aim to investigate behavior tied to specific user groups, but merely uses this setup as a method to create some diversity amongst the users in the simulation. Nevertheless, one should bear in mind that greater diversity in user behavior will most probably occur in real network data when investigating cluster signatures.

Furthermore, this simulation assumes for simplicity that nobody leaves or arrives in the city area during the simulation time. However, as the analysis are performed primarily on cell level, where users may leave and arrive during the simulation, this assumption will not limit the analysis. It should be noted that the users in this simulation will not "bounce off" the edges of the map, but merely continue in a mirrored point of the map. It should also be noted that 600 users are very low for a real network environment in a city.

Lastly, the data set is a result of only 60 minutes of simulated behavior. It is understood that there could be variations in user behavior during a day, as well as some variations in behavior between weekdays, which this disclosure will not explicitly deal with.

Clustering

The first clustering approach is to implement the K-means algorithm as explained above due to its easy implementation and its documented effect on similar kind of data. A K-means clustering based on the probability density function (PDF) of a certain feature called signal-to-interference-ratio has previously been used to create clustering classes. The resulting clusters with a characteristic PDF were used as labels for supervised classification of other data. In the paper, the classifier used was the K-nearest-neighbor classifier, a classifier that searches for the K nearest training vector based on an input vector sample, and assigns the class that is presented by the majority of its neighbors.

However, although having the strength of being a simple method, the K-means algorithm is typically fast for low dimensional data—and it is found that the algorithm is too computationally slow for the large data sets in this disclosure. Furthermore, as can be understood from the steps explained in above, K-means might terminate at a local optimum and fail to find a global optima. Additionally, K-means will not identify outliers and might have trouble with noisy data, and will also be restricted to data which has the notion of a center.

Instead, clustering using the GMM algorithm explained above is considered.

One of the strengths of the GMM algorithm is the interpretability of the model, i.e. it learns a generative model of each cluster which enables generation of new data based on the model learned through GMM clustering. Moreover, as the assignment of clusters to observations (E-step) and re-estimation of parameters (M-step) is based on probabilistic membership, the assumptions are stronger than for K-means. However, it should be noted that GMM also can terminate at a local optimum, hence the initializations of parameters is rather important. Furthermore, the algorithm will experience problems with discovering clusters with non-convex shapes. Both the K-means and GMM algorithm requires a pre specified number K of clusters, a process explained below.

The d=5 features used for clustering is those of typically available in a radio access network node, namely
{wireless device throughput, CQI, time to handover, cell throughput, number of active wireless devices}

Other features available in the data set that could have been included based on the availability criterion is previous user throughput, number of wireless devices in queue and rank. However, as the first two are highly correlated with user throughput and number of active wireless devices, respectively, they are excluded in this particular embodiment, as is rank, due to its range restricted to $\{1, 2\}$, in order to avoid an imbalanced set of features. As the magnitude of the features in the data set differs, scaling is used to normalize the values in order to allow for equal impact on the clustering. Knowledge of clusters within a cell is of primary interest in this disclosure, hence subsets $C_j$ of data for every cell is used for clustering;

$$C_j \subseteq D \text{ for } j=1, \ldots, 33.$$

The dimensions of $C_j$, $j=1, \ldots 33$ vary as the number of observations in each cell differ, ranging from 0.5-1 million observations in $\mathbb{R}^d$, where $\mathbb{R}^d$ denotes the features used in the clustering algorithm.

It should be noted, as will also be seen later in this disclosure, that correlation between some of the variables in exist, primarily between cell throughput and number of active wireless devices, which are highly correlated. Additionally, some of the features are discrete. Both these issues can lead to singular or close-singular covariance matrices $\Sigma_k$. Therefore, when implementing the clustering algorithm, a regularization term of $10^{-5}$ was added, in order to prevent singularity.

Number of Components

Two approaches to determine the optimal number of components are implemented. As mentioned in above, choosing K is one task in order to describe a model sufficiently while still avoiding overfitting. The two complementing methods are found to suggest the same optimal number of K, which for this data set is K=5.

Bayesian Information Criterion

A known way to determine the optimal number of components this is to investigate the Bayesian Information Criterion (BIC) for different K. The BIC for model selection is given by $$\text{BIC} = -2 \log l(\lambda) + K \log N^*$$

where $\log l(\lambda)$ is the log-likelihood as given above, K is the number of components and $N^*$ the number of observations in the data set. The number of components is therefore determined by manually extracting the BIC for $C_j$, $j=1, \ldots, 33$, for every $K \in \{1, 2, \ldots, 8\}$. A graphical representation of the normalized BICs can be found in FIG. 6.

BIC is closely related to the Akaike information criterion (AIC), substituting $N^*$ by 2 in the above expression for BIC. However, one should note that as they have different objective target models, they are not directly comparable: While AIC aims to select a model that in the most satisfactory way characterize an unknown, high dimensional reality—outruling reality from the set of candidate models being considered—BIC searches for the true model among the set of candidates.

Nevertheless, the practical difference is the size of the penalty, whereas the BIC penalizes model complexity more deliberately than AIC. There is a chance that the AIC model chooses a too complex model independently of N* whereas BIC has a very little chance of doing so for a sufficient N*. However, BIC has a larger chance than AIC to choose a model that is too small, independently of N*. Generally, it is often wise to inspect both AIC and BIC together in model selection, and upon inspecting the AIC for this model it is found that the criteria agree on the same model.

Figure 6:
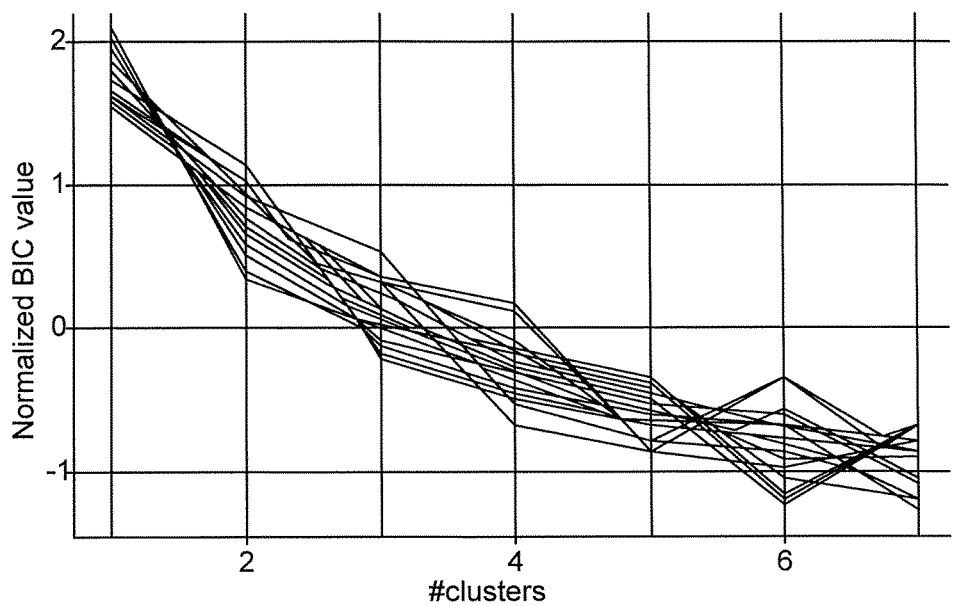
FIG. 6 schematically illustrates a graphical representation of normalized BICs.

As can be observed in FIG. 6, the curves flat out after k=5, thus representing the "elbow" indicating the appropriate number of clusters. The elbow represents an area of which when passed by increasing the number of components, the model will offer much less significant improvement. Evaluating the above expression for BIC, it is obvious that the BIC will continue to decrease until K→N, symbolizing a model where each observation has a unique component of its own, but at some point the problem of overfitting the model will occur.

The approach for avoiding overfitting while still optimizing the accuracy of a model is therefore to choose a number of components around the area where the curves flat out, hence the number of components is chosen to be K=5 for 5 for $C_j$, j=1, . . . , 33. However, such a decision based on a visual interpretation of graphical material without a mathematical formalization might be error prone. Indeed, by the looks of FIG. 6, one could argue that K=4 or K=6 are just as good representations of the elbow and therefore optimal. Other approaches for determining the optimal number of components K have been suggested, one of then being the "gap statistic", also implemented in this disclosure to complement the BIC argument.

Gap Statistic

The concept of the gap statistic was introduced in a statistical procedure to formalize the elbow concept was proposed. The theory is based on the following approach:

For a data set $D^* = \{x_i \in R^d, i=1, \ldots, N^*\}$, we the squared Eucludian distance is used to define the distance $d_{ii'}$ between observations i and i' such that $$d_{ii'} = \|x_i - x_{i'}\|^2$$

After clustering the data into K clusters $C_k$, k=1, . . . , K where the observations in each cluster is given by $n_k = |C_k|$, the pairwise distances for all points in cluster k is given by $$D_k = \sum_{i,i' \in C_k} d_{ii'}$$

Using this, the pooled within-cluster sum of squares (WCSS) $W_K$ around the cluster means is given by $$W_K = \sum_{k=1}^{K} \frac{1}{2n_k} D_k$$

The approach of the gap statistic is to standardize the graphical comparison of log $W_K$ with an appropriate distribution with no obvious clustering, called a null reference distribution. This is typically generated by a uniform sampling using the parameter boundaries of the data. Through this comparison the optimal K is found to be the K for which log $W_K$ falls the farthest below the reference curve given by the null distribution. Formalizing this in a formula yields $$\text{Gap}_n(K) = E_n^*[\log W_K] - \log W_K = \frac{1}{B}\sum_{b=1}^{B} \log W_{Kb}^* - \log W_K$$

where $E_n^*$ denotes the expectation under a sample of size n from the null reference distribution. This is estimated by computing the average of B copies generated with a Monte Carlo sample from the null distribution, each giving within-dispersion measures $W_{Kb}^*$, b=1, . . . B for the number of clusters K. These will exhibit a standard deviation $$sd(K) = \sqrt{\frac{1}{B}\sum_{b=1}^{B}\left(\log W_{Kb}^* - \frac{1}{B}\sum_{b=1}^{B}\log W_{Kb}^*\right)^2}$$

Combining the standard deviation in this expression with the simulation error yields the quantity $s_K$ defined as $$s_K = \sqrt{1 + 1/B} \, sd(K)$$

The optimal $\hat{K}$ is the smallest K such that $$\text{Gap}_n(K) \geq \text{Gap}_n(K+1) - s_{K+1}$$

The generality of this measure makes it applicable to any clustering method, and even other distance measures $d_{ii'}$ other than the squared Euclidian distance. Note that when using this on clustering by the use of Gaussian Mixture Models, log $W_K$ has an interpretation as a log-likelihood as presented above.

Figures 8, 9:
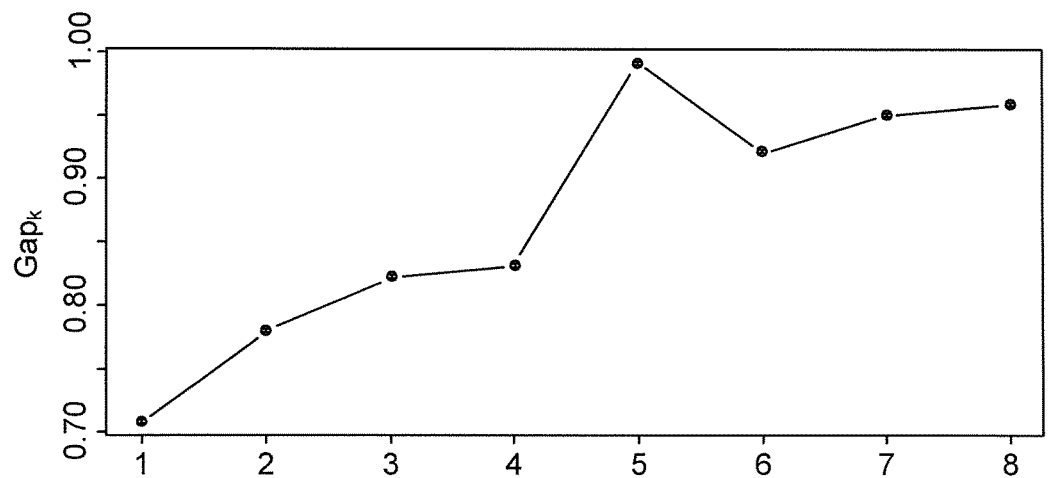
FIG. 8 schematically illustrates gap statistics.
FIG. 9 schematically illustrates a confusion matrix.

Implementing this method on the data set $C_1$ yields estimates of the gap statistic as illustrated in FIG. 8, for K∈{1, . . . , 8} and B=10. Similar results are obtained for the other $C_j$, j=2, . . . , 33 as well, indicating the same $\hat{K}$.

It is evident from FIG. 4 that the optimal number of components is $\check{K}$=5, confirming the optimal number of components found by investigating the BIC curves.

Classification

While clustering is a method of unsupervised learning, classification is a method of so called supervised learning, as the algorithm is dependent of having response variables/labels. A classification model is built on a training set of data, and tested on a different set of data called the test set. The output is a table carrying information regarding how many correct classifications were made. This kind of table is often called a confusion matrix or contingency table, see FIG. 9.

The notations in FIG. 9 denotes the following: a true positive classification is equivalent with a hit, true negative is equivalent with a correct rejection, false positive denotes a Type I error and false negative denotes a Type II error.

Accuracy

When investigating the accuracies, the following terminology is used:

The sensitivity, also called the true positive rate given by $$\text{sensitivity} = \frac{TP}{P} = \frac{TP}{TP + FN}$$

and the specificity, also called the true negative rate $$\text{specificity} = \frac{TN}{N} = \frac{TN}{FP + TN}$$

and the balanced accuracy, representing the average accuracy obtained on either class, given by $$\frac{\text{sensitivity} + \text{specificity}}{2}$$

Often the measure of accuracy, given by $$\frac{TN + TN}{P + N},$$

is used instead of balanced accuracy. However, for imbalanced data sets this might be a deceiving performance measure; an imbalanced data set has different number of representatives from each of the classes. This is due to the problem arisen from when a classifier gets biased towards a class of greater representation, because when this classifier is applied to a test set imbalanced in a similar manner the accuracy estimate may be rather optimistic. The classification in this disclosure is performed on the responses given by a clustering algorithm and there is no guarantee that the clusters found during clustering are of equal sizes. Hence, the balanced accuracy is used as a measure of the results in this disclosure.

One-Vs-all

A common strategy for solving multi-class classification problems is to reduce it to multiple binary classification problems, one of which is called the one-vs-all strategy. With this approach, a classifier for each class (response variable) is used, treating each class as positive samples and the remaining classes as negative samples. However, using this strategy one should bear in mind two relevant problems associated with the approach.

Firstly, there might be differences between the confidence and accuracy tied to the different binary classes, hence one should be sure to investigate all such outputs separately in complement to a mean value across the classes.

Furthermore, as the number of negative samples typically will outnumber the number of positive samples (here, the negative samples will be represented by observations from K−1=4 clusters, whilst the positive samples will come from a single cluster), the classification algorithm might be biased towards getting the negatives correct (TN) rather than the positives (TP). This problem can be identified by experiencing much higher specificities than the corresponding sensitivities for the classifier. This problem is addressed by using the balanced accuracy instead of accuracy, but one should still look at both sensitivity and specificity to understand the balanced accuracy in case there are great differences between the two measures.

Algorithm

Many classification algorithms have been developed, and exhibit different pros and cons. The algorithm used in this particular embodiment is based on Anagram for Classification And Regression Trees (CART) models, also known as decision trees, which is based on the following approach.

Figure 10:
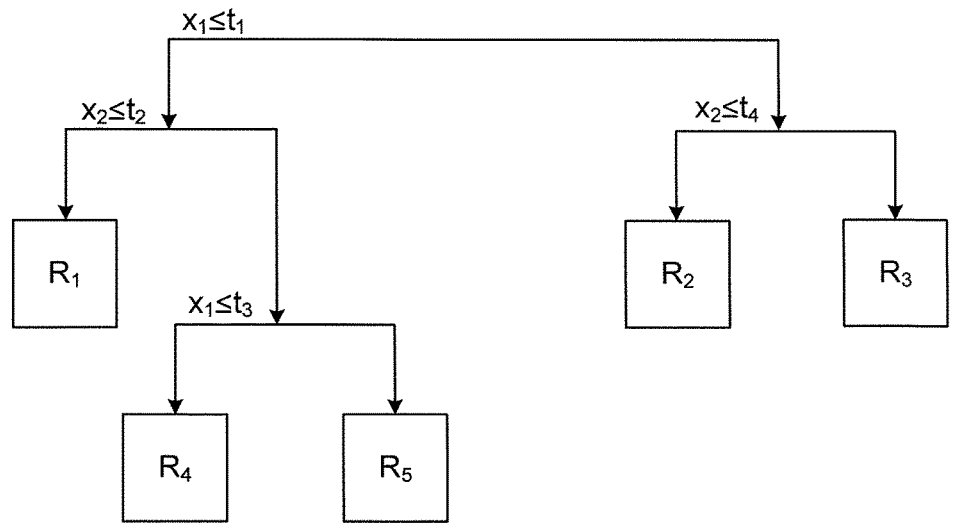
FIG. 10 schematically illustrates a decision tree.

In a decision tree some input values $x_k$ are tested against some threshold values $t_l$ in every node in descending order, building deep trees ending in regions $R_m$ based on these conditions, see FIG. 10.

Mathematically, the model can be expressed as $$f(x) = E[y | x] = \sum_{m=1}^{M} w_m I(x \in R_m) = \sum_{m=1}^{M} w_m \phi_m(x; v_m)$$

where $w_m$ is the mean response in the corresponding region $R_m$, in which $\phi_m(x; v_m)$ is the basis function learned from the data with parameters $v_m$, which denotes the choice of variable $x_k$ to split on with the threshold value $t_l$.

To determine the best feature and its best value to split on, the following split function is used;

$$(j^*, t^*) = \arg\min_{j \in \{1, \ldots, D\}} \min_{t \in T_j} c(\{x_i, y_i : x_{ij} \leq t\}) + c(\{x_i, y_i : x_{ij} > t\})$$

where c denotes a cost function. The cost functions are acquired in a similar manner as for regression, where the cost is the sum of squared residuals $\Sigma_{i \in D}(y_i - \bar{y})^2$ in a data set D. To acquire this, the class-conditional probabilities are first estimated by $$\hat{\pi}_c = \frac{1}{|\mathcal{D}|} \sum_{i \in D} I(y_i = c)$$

In this particular embodiment, the Gini index is used as a measure of error rate. As this expression is the probability that a random entry in the leaf belongs to class c, $(1-\hat{\pi}_c)$ denotes the probability that it would be misclassified, and the expected error rate is given by the Gini index as $$\sum_{c=1}^{C} \hat{\pi}_c(1 - \hat{\pi}_c) = \sum_c \hat{\pi}_c - \sum_c \hat{\pi}_c^2 = 1 - \sum_c \hat{\pi}_c^2$$

If a predictor variable has a low Gini value, or equivalently a higher decrease in Gini, it means that the variable plays a greater role in the partitioning of data into the classes.

Advantages for CART models are inter alia that they can handle a mix of discrete and continuous inputs without difficulty, which is necessary for this data. Moreover, CART models are able to perform automatic variable selection, which is an advantage as we do not have knowledge of which (if any) features have more impact on a cluster than others. Lastly, CART models are known to handle large data sets well, which is crucial with the dimensions of data sets in this work. To address the some disadvantages of CART models, due to their greedy nature often resulting in quite low accuracy, the Random Forest algorithm was used.

Random Forest has been found to be a highly accurate classification algorithm in an empirical comparison of such methods; a classifier from the Random Forest family may outshine other classifiers in a comparison. The classification algorithm is based on the concept of decision trees, but instead of growing a single, "deep" tree, random forest uses multiple shallow decision trees and aggregate over them to improve accuracy. Random forest is robust to overfitting, as each tree gets a bootstrapped version of the original training data. Furthermore, randomness is used in every node when selecting which feature to split on. The responsive variable is determined by the votes (positive or negative) of the majority of the trees.

Results and Analysis
Clustering

Figure 11:
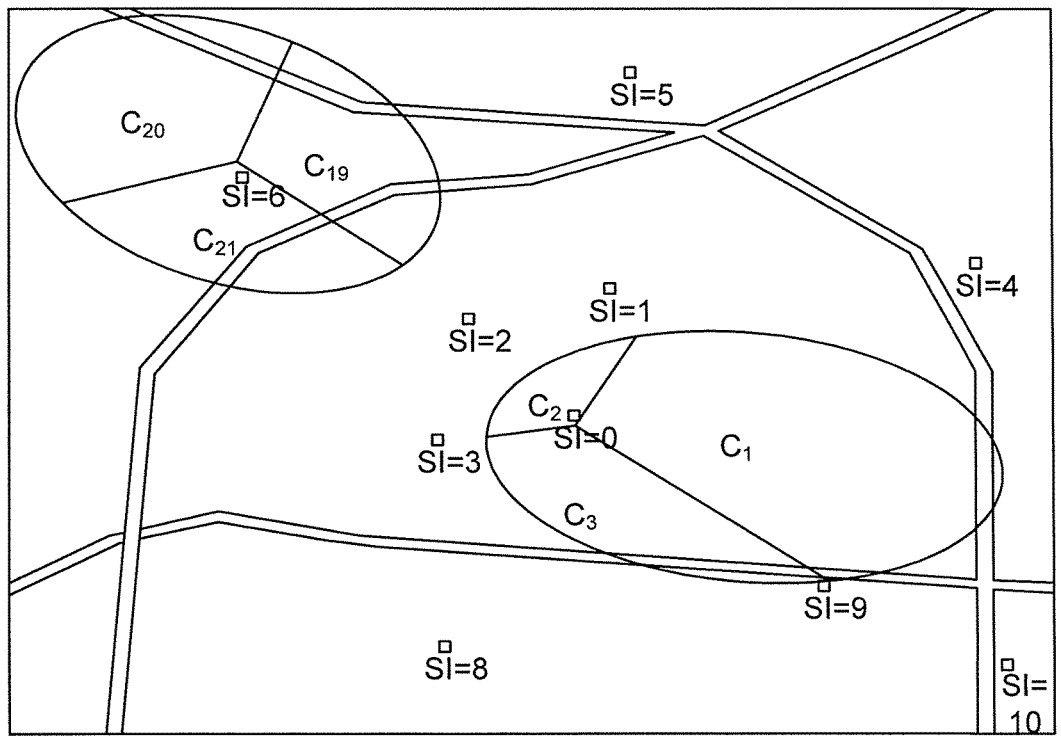
FIG. 11 schematically illustrates the coverage areas for radio access network nodes 1 and 6 in the simulated city environment of FIG. 7.

The clustering was performed on all subsets $C_j$, j=1, . . . , 33, but in order to facilitate the analysis and presentation of results, two cells representing different geographical locations are chosen as primary analysis objects, namely cells numbered 1 and 19. The approximate coverage areas of the corresponding radio access network nodes, 1 ($C_1$, $C_2$, $C_3$) and 6 ($C_{19}$, $C_{20}$, $C_{21}$), are shown in FIG. 11.

The clustering was performed on d=5 features with K=5 components. Hence, the GMM output for every data set $C_j$, j=1, . . . , 33 was a mixture of K multivariate normal distributions for clusters $\ddot{C}_k^{(j)}$, k=1, . . . , K with means $\mu_k \in \mathbb{R}^d$, and covariance matrices $\Sigma_k \in \mathbb{R}^{d \times d}$.

The proportion of each cluster $C_k^{(j)}$, k=1 . . . , K, j={1, 19} in $C_1$ and $C_{19}$ are found in Table 4.

TABLE 4

Proportions of each cluster.

| | j = 1 | j = 19 |
|---|---|---|
| $C_1^{(j)}$ | 10.7% | 14.8% |
| $C_2^{(j)}$ | 18.6% | 18.0% |
| $C_3^{(j)}$ | 19.3% | 17.0% |
| $C_4^{(j)}$ | 29.9% | 33.7% |
| $C_5^{(j)}$ | 21.5% | 16.5% |

Cluster Signatures

Once the cluster stamp for each observation is obtained, it may be of interest to understand the signature of each cluster.

Using this kind of information, if a classification algorithm can be used to classify users in $C_1$ into e.g. $C_2^{(1)}$ based on a short time frame of information, it can be expected that this user will experience a high channel quality but not high user throughput, and have short time until handover—thus preparing for finding a new channel earlier than when a user approaches the cell boundaries. One way to do this classification is to use the Random Forest classification algorithm, which will be presented below.

Figure 12:
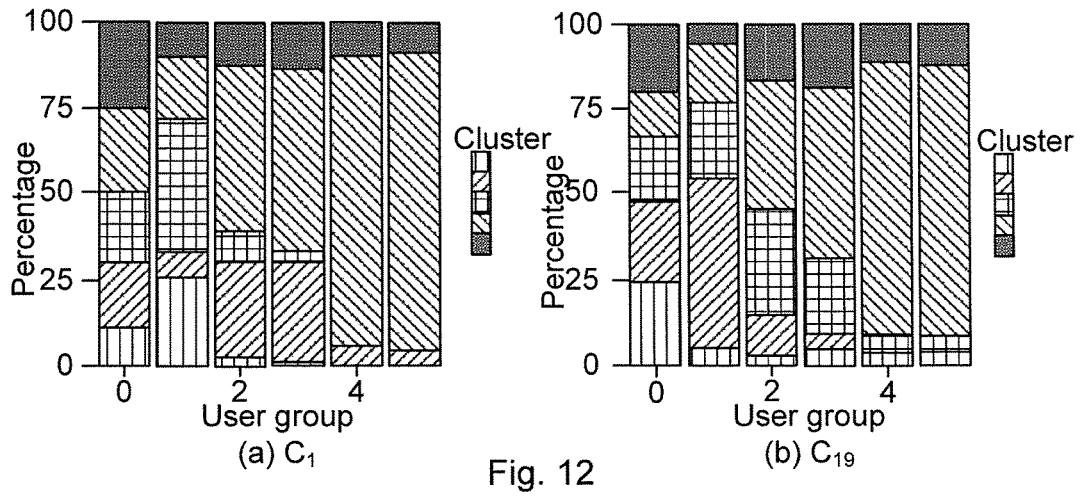
FIG. 12 schematically illustrates a graphical illustration of the proportion of observations by each user group tied to clusters 1 and 19.

One observation is that the GMM did to some extent manage to identify the user groups as presented in Table 3, see FIG. 12. Note that a majority of the highway drivers, $U_4$ and $U_5$, are represented by a single cluster in both cells, $C_4^{(1)}$ and $C_4^{(19)*}$ (note that $C_4^{(1)}$ and $C_4^{(19)*}$ are the proportionally biggest clusters according to Table 4), and some clusters are not even tied to any highway driver. In fact, the only user group that seems to have a close-uniform distribution amongst cluster identities is the indoor users in $U_o$. This might be a result of the fact that $|U_0|=7|U_l|$, l=1, . . . , 5, but differences in cluster proportions can still be seen amongst the equal sized $U_1, \ldots, U_5$.

Temporal Behavior
Time in Cluster

One aspect to enable prediction based on this clustering, is to know how long a wireless device is expected to stay in a cluster once entered and which cluster the wireless device is expected to be in next, given the knowledge of which cluster the wireless device belongs to at the moment. The densities of time spent in the clusters are shown in FIG. 13.

Note that the densities do have a heavy right tail, due to occasional visits as high as two minutes, but they are cut in these figures for presentational purposes.

Figure 13:
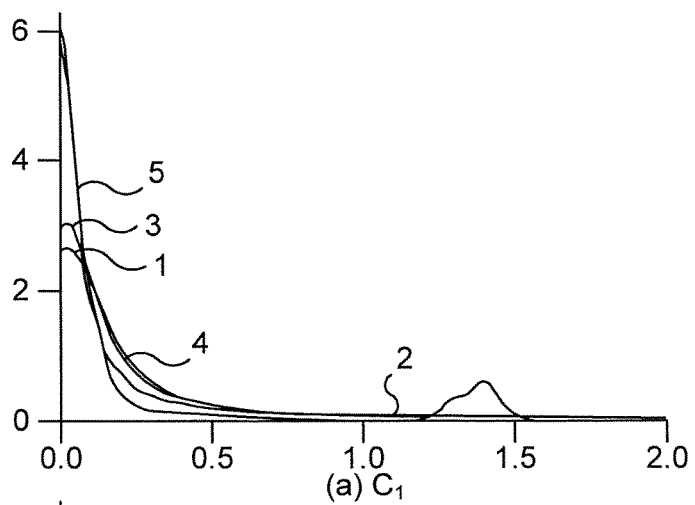
FIG. 13 schematically illustrates density of time in cluster in seconds for clusters 1 and 19.
Figure 13:
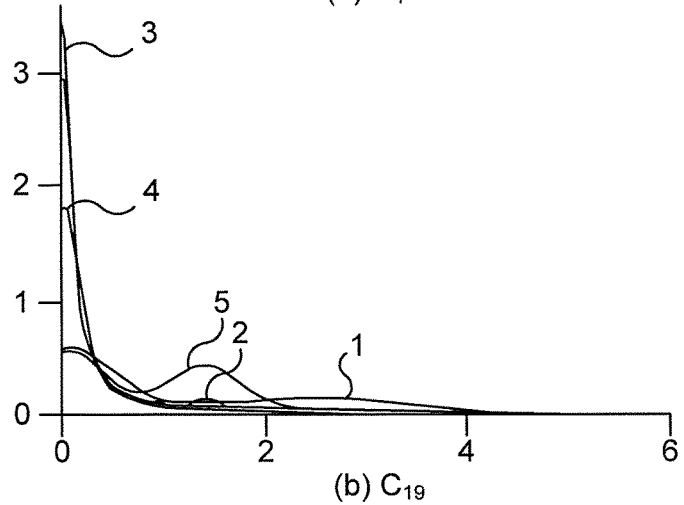

As can be observed in FIG. 13, the expected time in a cluster differs only slightly amongst $C_k^{(1)}$, k=1, . . . , K, with the exception of $C_5^{(1)}$, Furthermore, observe that the time spent in each cluster is very short, most being <0.5 seconds, suggesting that a classification should be made in a very short time frame in order to be useful. However, in $C_{19}$ a higher time spent in each cluster can be observed, as well as differences amongst $C_k^{(19)}$, k=1, . . . , K. Using this information in combination with cluster signatures as presented above can enable prediction of future user behavior that can be useful for RRM.

The time spent in clusters as presented above are quite low, hence an aggregated look at this might be useful. The user sessions (defined as all consecutive seconds in which the same user transmits at least one bit) $D_s$ was found to follow a exponential distribution in logarithmic scale as $D_s=10^\Delta$ where $\Delta \sim Exp(0.3591)$. Hence, $D_s$ exhibits heavy-tail characteristics with Pareto index ($\alpha$ in $F(x)=1-(c/x)^\alpha$) $\alpha_D=1.21$ resulting in a mean value of $D_s=5.71$ s. From this distribution, a majority of the users will have a user session $D_s>1.8$ s, and some sessions will be much longer. Hence, one could expect that a user should belong to a certain cluster, a "main" cluster, a majority of the time within a certain longer time frame corresponding to a user session, with only a few observations along the time series tied to another cluster. Such observations would divide the aggregated longer visit to multiple short visits with this "interruption", resulting in a higher density for shorter time in cluster. Hence, it might be of greater interest to aggregate this series and investigate whether such a main cluster does exist, and if it does—evaluate the time spent in the main cluster and the corresponding expected behavior.

Cluster Transitions

The information regarding which cluster the wireless device is likely to be in next can be evaluated using Markov Chains, and investigating the K×K transition matrix of the clusters in a cell. The element in row k' and column k in the transition matrix indicates the probability of being in cluster k at time t given that it is in cluster k' at time t− 1, $$p_{k'k}=P(x_t=C_k^{(j)}|x_{t-1}=C_{k'}^{(j)})$$

The transition matrices for the clusters in $C_1$ and $C_{19}$ is given by $$T_{C_1} = \begin{bmatrix} 0.914 & 0.017 & 0.053 & 0.000 & 0.017 \\ 0.009 & 0.835 & 0.038 & 0.106 & 0.012 \\ 0.030 & 0.037 & 0.854 & 0.006 & 0.072 \\ 0.000 & 0.066 & 0.004 & 0.898 & 0.033 \\ 0.008 & 0.009 & 0.067 & 0.045 & 0.871 \end{bmatrix}$$

$$T_{C_{19}} = \begin{bmatrix} 0.910 & 0.002 & 0.015 & 0.042 & 0.032 \\ 0.002 & 0.962 & 0.033 & 0.001 & 0.003 \\ 0.014 & 0.034 & 0.895 & 0.047 & 0.011 \\ 0.018 & 0.001 & 0.024 & 0.932 & 0.025 \\ 0.027 & 0.005 & 0.009 & 0.054 & 0.906 \end{bmatrix}$$

As can be observed from the diagonal elements, the probability for staying in the same cluster varies, where the differences does not originate from the sizes as presented in Table 4. The high probabilities of staying is quite expected, as the time step for the probability of 100 ms is very low.

Furthermore, differences amongst the probabilities can be observed, suggesting that a wireless device is more prone to transfer to certain clusters than others. For example, a person in $C_4^{(1)}$ is more than 16 times as likely to be in $C_2^{(1)}$ compared to $C_3^{(1)}$, and have an infinite small probability to be in $C_1^{(1)}$ next.

Recall that the proportions of the clusters differed amongst the user groups $U_0, \ldots, U_5$. In some radio access network nodes it is possible to determine the velocity of wireless devices in the cell, hence with that information, separate transition matrices for $U_0, \ldots U_5$, can be formed, which for the subset $C_1$ are given by the following:

$$\begin{bmatrix} 0.92 & 0.01 & 0.05 & 0.00 & 0.02 \\ 0.01 & 0.85 & 0.03 & 0.10 & 0.01 \\ 0.03 & 0.03 & 0.85 & 0.01 & 0.08 \\ 0.00 & 0.08 & 0.00 & 0.89 & 0.03 \\ 0.01 & 0.01 & 0.07 & 0.02 & 0.89 \end{bmatrix}_{U_0}$$

$$\begin{bmatrix} 0.93 & 0.00 & 0.06 & 0.00 & 0.01 \\ 0.01 & 0.74 & 0.15 & 0.09 & 0.01 \\ 0.04 & 0.03 & 0.91 & 0.00 & 0.02 \\ 0.00 & 0.03 & 0.01 & 0.94 & 0.02 \\ 0.04 & 0.01 & 0.08 & 0.03 & 0.84 \end{bmatrix}_{U_1}$$

$$\begin{bmatrix} 0.76 & 0.16 & 0.07 & 0.00 & 0.01 \\ 0.02 & 0.80 & 0.06 & 0.11 & 0.01 \\ 0.02 & 0.20 & 0.69 & 0.01 & 0.08 \\ 0.00 & 0.06 & 0.00 & 0.90 & 0.04 \\ 0.00 & 0.03 & 0.07 & 0.17 & 0.73 \end{bmatrix}_{U_2}$$

$$\begin{bmatrix} 0.62 & 0.35 & 0.02 & 0.00 & 0.01 \\ 0.01 & 0.82 & 0.03 & 0.12 & 0.02 \\ 0.01 & 0.24 & 0.66 & 0.01 & 0.08 \\ 0.00 & 0.07 & 0.00 & 0.88 & 0.05 \\ 0.00 & 0.04 & 0.02 & 0.20 & 0.74 \end{bmatrix}_{U_3}$$

$$\begin{bmatrix} 0.00 & 0.00 & 0.00 & 0.00 & 0.00 \\ 0.00 & 0.41 & 0.00 & 0.56 & 0.03 \\ 0.00 & 0.00 & 0.00 & 0.00 & 0.00 \\ 0.00 & 0.04 & 0.00 & 0.91 & 0.05 \\ 0.00 & 0.03 & 0.00 & 0.41 & 0.56 \end{bmatrix}_{U_4}$$

$$\begin{bmatrix} 0.00 & 0.00 & 0.00 & 0.00 & 0.00 \\ 0.00 & 0.37 & 0.00 & 0.59 & 0.04 \\ 0.00 & 0.00 & 0.00 & 0.00 & 0.00 \\ 0.00 & 0.03 & 0.00 & 0.92 & 0.05 \\ 0.00 & 0.03 & 0.00 & 0.51 & 0.46 \end{bmatrix}_{U_5}$$

It can be observed from the above matrices that the transition probabilities are significantly higher for some clusters than others for the vehicular user groups ($U_2$, $U_3$, $U_4$, $U_5$) moving with high velocities—especially for the highway users that are only represented in three of the clusters. More specifically, for every row there is one probability that, except for the diagonal element, is considerably greater than the others. This implies that if information regarding velocity of a wireless device is available, the probability of predicting $C_k$ at time t correctly is much higher than without that information, given that the prediction is made on the highest probability. Note that transition matrices for $U_o$ and $U_1$, which together accounts for ⅔ of the wireless devices, resemble that of the aggregated $T_{c_1}$.

One reason behind these differences are most probably that time to handover is included as a clustering feature in the GMM model, which will differ for a vehicular user moving fast through the city than an indoor user or a pedestrian moving slowly across the map. However, as was shown above, the cluster signatures differs significantly for the other features as well, hence discards a circular argument starting and ending with time to handover.

Note that the concept of aggregating over a main cluster as mentioned above could be applied here as well.

Prediction of Load

For RRM application purposes, a valuable concept could be if the user throughput could be predicted. Therefore, another clustering using the GMM algorithm was performed without user throughput as an input feature, hence the GMM algorithm was performed on the data set with features {CQI, time to handover, cell throughput, number of active wireless devices}

The resulting clustering identities $\check{C}_k^{(1)}$, k=1, ..., K was compared to the "hidden" variable user throughput in the full data set. A graphical representation of the density of user throughput for each of the assigned clusters for $C_1$ is shown in FIG. 14.

It can be observed that the distribution of user throughput differs amongst the clusters even though the feature is not used in the clustering. While $\check{C}_1^{(1)}$, $\check{C}_3^{(1)}$ and $\check{C}_5^{(1)}$ seem to have quite similar distributions, $\check{C}_2^{(1)}$ and $\check{C}_4^{(1)}$ seem to follow another distribution. Moreover—it seems possible to identify users with typically higher load demands, as can be observed by $\check{C}_2^{(1)}$, which would be valuable information for RRM.

Validation

Figure 15:
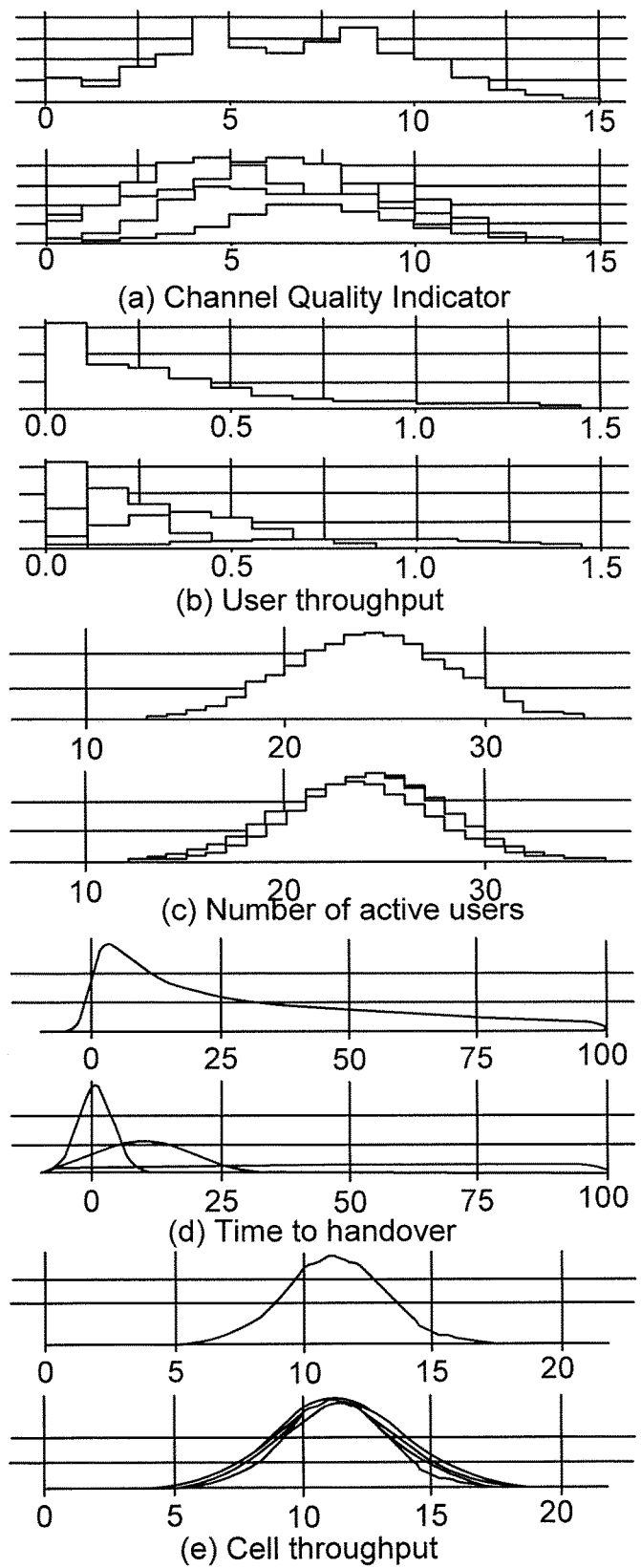
FIG. 15 schematically illustrates a comparison of a model built with trained data and used for test data.

To investigate whether the model parameters $\mu_k$ and $\Sigma_k$ are in fact representative of the data, another clustering is performed on a training set of data, being the first 30 minutes, and compared with a test set of data, being the last 30 minutes. Hence, the set notations are $$C_j^{train}(\tau) = \{x \in C_j : t \leq \tau\}, C_j^{test}(\tau) = \{x \in C_j : t > \tau\}$$

where $\tau=1800s$. A comparison of the PDFs from the mixture model of the K clusters' multivariate normal distributions $N_d(\mu_k, \Sigma_k)$ for each of the d train features as obtained from GMM on $C_j^{train}$, with the density curves for the corresponding features in $C_j^{test}$ can be seen in FIG. 15. The discrete features Channel Quality Index and number of active wireless devices are graphically presented as histograms instead; the distributions of user throughput are plotted as discrete values because of properties of the simulation, yielding values as 0.06n where n is an integer. For small values on the x-axis it will therefore appear discrete. Results of clustering on $C_1$ are presented. Similar results were found for the other $C_j$, j=2, ..., 33.

Figure 16:
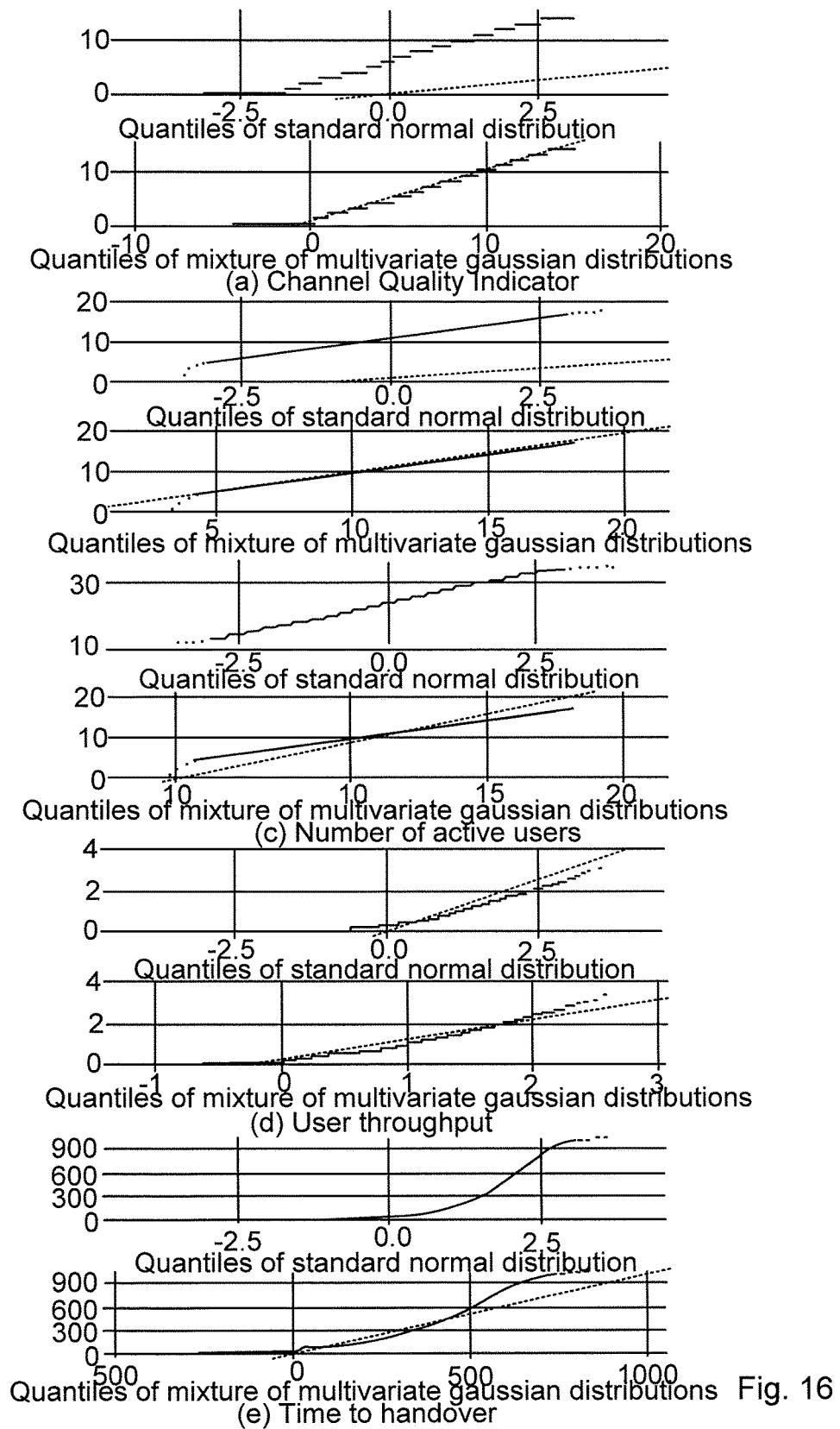
FIG. 16 schematically illustrates Q-Q plots.

Although the model was not built on the data in the test set, it is evident from these plots, that the distributional model is representative. This can be further illustrated by observing the Quantile-Quantile (Q-Q) plots of the features and comparing the quantiles, which is a more robust approach. In FIG. 16 the quantiles of the d features from $C_j^{test}$ (on the y-axis) are compared to both a quantiles of a standard normal distribution N(0, 1) and to quantiles of the mixture model of multivariate Gaussian distributions $N_d(\mu_k, \Sigma_k)$, k=1, ..., K as built on $C_j^{train}$.

The underlying theory of a Q-Q-plot is that two similar distributions will yield points located approximately on the identity line y=x, whilst if they are a linear combination of one another the points will be located on another straight line. This can be observed in the upper plots in FIG. 16 to be the case for Channel Quality Indicator, cell throughput and number of active users—suggesting that the distribution of the feature can be modelled as a linear combination of a standard normal distribution. Plotting against the quantiles of the mixture model of multivariate Gaussians however, the quantiles are located on the line y=x, justifying that the model found is representative of the data.

Figure 17:
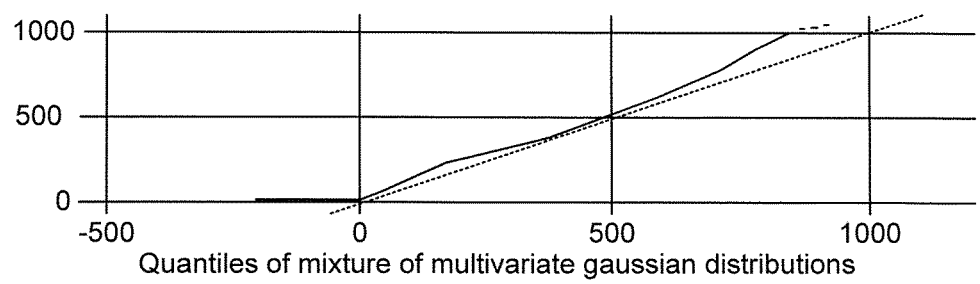
FIG. 17 schematically illustrates quantiles of time to handover in full data set of cluster 1 versus corresponding quantiles of a GMM model built on cluster 1.

In the upper plots of FIG. 16 a non-linear relationship with the quantiles of N(0, 1) can be observed, suggesting that another model might be appropriate for user throughput and time to handover. Indeed, when evaluating the lower plots, the mixture of multivariate Gaussians $N_d(\mu_k, \Sigma_k)$ seem to be a better fit for user throughput. However, as can be interpreted from the upper tail that curves upwards in the lower plots in FIG. 16, there still seems to be some long tailed characteristics in the data that the GMM could not model, due to the property of Gaussians to not have heavy tailed distribution. Another possible reason behind this behavior is that time to handover is obviously time dependent, which might create problems as the training set consist of data from the first 30 minutes and test set of the last. When investigating the QQ-plot of the quantiles of the full data set compared to quantiles of the GMM model built on that data set, more of a linear relationship can be observed, see FIG. 17 One could argue that to divide $C_j^{train}$ and $C_j^{test}$ by random sample instead of a time threshold $\tau$ might address this. However, heavy tail characteristics are still present when comparing the full data set with GMM, suggesting that the non-linearity in FIG. 16 might originate from both reasons discussed.

Classification

As explained above, classification based on the Random Forest algorithm is performed on the data set, using the cluster names obtained from the full clustering output as responsive variables. The model is built on training sets $C_j^{train}(\tau)$ and evaluated on test sets $C_j^{test}(\tau)$ as defined above. Recall that Random Forest is robust against overfitting, maintaining immune to issues with choosing too many trees to grow. Hence the number of trees was chosen to be the R standard of 500, although similar results were obtained for both a tenth of that amount and, naturally, higher number of trees.

For presentational simplicity, the output from the classification algorithm performed on the subset $C_1$ is presented. A small, random sample of the data is used in order to increase computational time, and high accuracies was found when using as little as 1% of the data. The confusion matrix for a run where $\tau$=1800s can be found in Table 2 above. As can be seen in Table 2, the Random Forest classifier yields a rather accurate result on the test set. It is more interpretable to investigate the test sensitivities, specificities and balanced accuracies.

As mentioned above, one problem with the One-vs-all strategy is that the confidence values might differ between the binary classes. Hence, the mean accuracies of the binary classes should be complemented by information regarding the accuracies for each class. However, in for most of the compilations run the differences are not of great extent, hence it is encouraged to observe the mean values here for simplicity if not stated otherwise.

Another possible issue introduced above is the problem of unbalanced distributions. This is addressed by using the measure of balanced accuracy rather than accuracy, as explained above. Nevertheless, also both the Sensitivity and Specificity of the classification can be investigated. The specificity will typically be greater than sensitivity due to the imbalance issue, although the sensitivity is of course more of interest in a one-vs-all classification; it may be of greater interest to know which cluster the observation is, rather than what cluster it is not. The differences are quite high for settings making it harder for the classifier (i.e. excluding user throughput or time to handover), and seem to be typically greater for the smaller clusters than for the larger ones, as expected as the imbalance between the positive and negative class increases.

Varying Time Frame of Training Data

One question is how much training data is needed in order to perform a good classification. Therefore, the data sets for training are varied with $\tau \in \{60, 600, 1800\}$, denoting 1, 10 and 30 minutes of training data respectively. Note that a sample is used for the classification, leaving $|C_j^{train}(60)| |C_j^{train}(600)|=|C_j^{train}(1800)|$ and similarly for $|C_j^{test}(\tau)|$. Hence it is only the time frame of data that varies.

Upon reducing the time frame training set, no significant differences occur, suggesting that only a short time frame of data, 1 minute, is needed in order to train the decision trees and still get correct classification. Nevertheless, as was discussed above, if cluster visits are mainly in the range of <1s, a much shorter time frame of data should be needed in order to make this useful. In this particular embodiment, the data set was too small to perform a classification with such a short time frame of training data, but it is envisioned that it may be performed. The results do still point towards a scenario where training on 1/60 of a time frame yields accurate classification results for the rest of the time frame.

Varying Classification Variables

Figure 18:
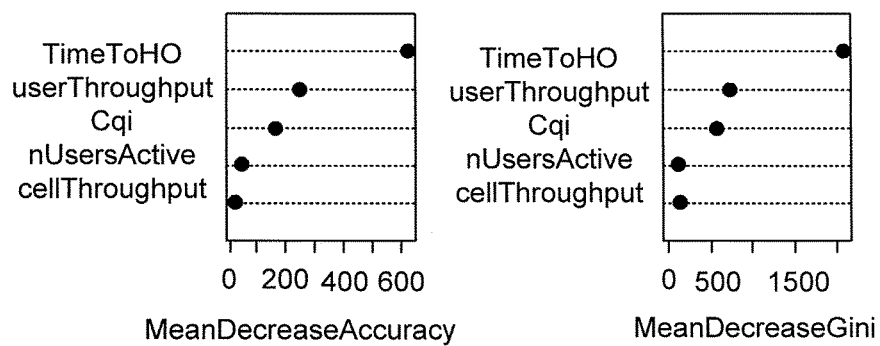
FIG. 18 schematically illustrates Decrease Accuracy and Mean Decrease Gini for predictor variables.

The Gini index was introduced above. Computing the Mean Decrease Gini for the different features yields the results found in FIG. 18, along with a representation of the Mean Decrease Accuracy.

It has been proposed to complement the Mean Decrease Gini with this value, representing the scenario of randomly permuting the predictor variable in out-of-bag samples. However, the output of both measures seems to be in more or less accordance, and both implies that the predictor variable time to handover is of greatest importance for the classifier.

Time to Handover

To address a possible scenario where information about the time to handover is not available, it is investigated how well the classifier would perform without this predictor variable. Furthermore, to gain knowledge about expected time until handover can be valuable from a RRM perspective, in the same manner as for user throughput.

The exclusion of time to handover as a predictor variable leads to a drop of the balanced accuracy to around 0.7 for all $\tau$, with quite high standard deviations. Upon inspecting the mean sensitivities, they are found to be only just above 0.5, also with a rather high standard deviation, suggesting that the individual classes should be evaluated. Indeed, for every $\tau$ there are two clusters where the classifier seem to correctly perform a positive classification in a minority of the cases, where $C_1^{(1)}$ is correctly classified in less than 20% of the cases. $C_1^{(1)}$ seem to represent "heavy hitters", which are valuable to identify from a RRM perspective. Hence, for scenarios where information regarding time to handover is not available, the introduction of other possible predictor variables should be evaluated in order to increase accuracy.

User Throughput

As mentioned previously, knowledge of expected throughput for a user might be valuable in from a RRM perspective. Therefore, it is investigated whether the classifier still would be able to classify correctly without using user throughput as a predictor variable. The mean balanced accuracies are lower when excluding user throughput, though not quite as low as when excluding time to handover. This is can be expected from the results found in Figure \ref{fig:gini}.

The classifier performs significantly worse—a sensitivity as low as 0.143 is found for $C_5^{(1)}$ when $\tau=60s$. However, it is does not seem to be quite as problematic for the classifier when given a larger time frame of training data, $\tau \in \{600, 1800\}$, where the sensitivities are kept over 0.38. Moreover, the issues seem to arise in particular for $C_5^{(1)}$, while the sensitivities for the other clusters all are >0.7 for all $\tau$. Users in $C_5^{(1)}$ tend to have a very low user throughput. In a viable scenario where it is of higher importance to recognize a high load user than a low load user, this classification can still be valuable if a sensitivity>0.7 is considered acceptable.

Mathematical Derivations

Derivation of EM-Parameters

From above the log-likelihood is given by $$\log l(\lambda) = \sum_{i=1}^{N} \left( \log \sum_{k=1}^{K} w_k g(x_i \mid \mu_k, \Sigma_k) \right)$$

Using that $$\frac{\partial}{\partial x} \log f(x) = \frac{1}{f(x)} \frac{\partial}{\partial x} f(x),$$

and that $$\frac{\partial}{\partial \mu_k} g(x_i \mid \mu_k, \Sigma_k) = g(x_i \mid \mu_k, \Sigma_k)(x_i - \mu_k)' \Sigma_k^{-1}$$

taking the derivative with respect to $\mu_j$ yields $$\frac{\partial}{\partial \mu_k} \log l(\lambda) = \sum_{i=1}^{N} \frac{1}{\Sigma_{k=1}^{K} w_k g(x_i \mid \mu_k, \Sigma_k)} \frac{\partial}{\partial \mu_k}$$

$$\left( \sum_{k=1}^{K} w_k g(x_i \mid \mu_k, \Sigma_k) \right)$$

$$= \sum_{i=1}^{N} \frac{1}{\Sigma_{k=1}^{K} w_k g(x_i \mid \mu_k, \Sigma_k)} w_k g(x_i \mid \mu_k, \Sigma_k)$$

$$(x_i - \mu_k)' \Sigma_k^{-1}$$

$$= \sum_{i=1}^{N} \gamma_{i,k}(x_i - \mu_k)' \Sigma_k^{-1}$$

Setting this equal to o to find the optimal $\mu_k$ yields $$\sum_{i=1}^{N} \gamma_{i,k} x_i = \sum_{i=1}^{N} \gamma_{i,k} \mu_k \Rightarrow \bar{\mu}_k = \frac{\sum_{i=1}^{N} \gamma_{i,k} \cdot x_i}{\sum_{i=1}^{N} \gamma_{i,k}}$$

In a similar manner, the derivative of $g(x_i \mid \mu_k, \Sigma_k)$ can be obtained with respect to $\Sigma_k$ as $$\frac{\partial}{\partial \Sigma_k} g(x_i \mid \mu_k, \Sigma_k) = g(x_i \mid \mu_k, \Sigma_k) \frac{1}{2}(-\Sigma_k^{-1} + \Sigma_k^{-1}(x_i - \mu_k)(x_i - \mu_k)' \Sigma_k^{-1})$$

Hence, the derivative of the log-likelihood is obtained to be $$\frac{\partial}{\partial \Sigma_j} \log l(\lambda) = \sum_{i=1}^{N} \frac{w_k g(x_i \mid \mu_k, \Sigma_k)}{\Sigma_{k=1}^{K} w_k g(x_i \mid \mu_k, \Sigma_k)} \frac{1}{2}(-\Sigma_k^{-1} + \Sigma_k^{-1}(x_i - \mu_k)$$

$$(x_i - \mu_k)' \Sigma_k^{-1})$$

$$= \sum_{i=1}^{N} \gamma_{i,k} \frac{1}{2}(-\Sigma_k^{-1} + \Sigma_k^{-1}(x_i - \mu_k)(x_i - \mu_k)' \Sigma_k^{-1})$$

setting this equal to zero yields $$0 = \sum_{i=1}^{N} \gamma_{i,k} \frac{1}{2}(-\Sigma_k^{-1} + \Sigma_k^{-1}(x_i - \bar{\mu}_k)(x_i - \bar{\mu}_k)' \Sigma_k^{-1})$$

$$= \sum_{i=1}^{N} \gamma_{i,k}(-\Sigma_k \Sigma_k^{-1} + \Sigma_k \Sigma_k^{-1}(x_i - \bar{\mu}_k)(x_i - \bar{\mu}_k)' \Sigma_k^{-1})$$

and solving for $\Sigma_k$ yields $$\sum_{i=1}^{N} \gamma_{i,k} =$$

$$\sum_{i=1}^{N} \gamma_{i,k}(x_i - \bar{\mu}_k)(x_i - \bar{\mu}_k)' \Sigma_k^{-1} \Rightarrow \bar{\Sigma}_k = \frac{\sum_{i=1}^{N} \gamma_{i,k} \cdot (x_i - \bar{\mu}_k)(x_i - \bar{\mu}_k)'}{\sum_{i=1}^{N} \gamma_{i,k}}$$

With the constraint that $\Sigma_{k=1}^{K} w_k = 1$, which can be handled by expressing $w_k$ in terms of unconstrained variables $\beta_k$ such that $$w_k = \frac{\exp \beta_k}{\Sigma_{k=1}^{K} \exp \beta_k}$$

from which the derivative with respect to the unconstrained variables can be obtained to be $$\frac{\partial w_k}{\partial \beta_j} = \begin{cases} w_k - w_k^2 & \text{if } j = k \\ -p_j p_k & \text{otherwise} \end{cases}$$

Using this, and the chain rule of differentiation yields $$\frac{\partial \log l(\lambda)}{\partial \beta_k} = \frac{\partial \log l(\lambda)}{\partial w_k} \frac{\partial w_k}{\partial \beta_k} = \sum_{i=1}^{N} (\gamma_{i,k} - w_k)$$

Setting this equal to o to find the optimal $w_k$ yields $$\overline{w}_k = \frac{1}{N} \sum_{i=1}^{N} \gamma_{i,k}$$

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for grouping wireless devices of a cell provided by a radio access network node, RANN, of a communications network, the method comprising:
acquiring user network data for wireless devices in the cell provided by the RANN and cell network data for the cell provided by the RANN;
determining groups for the wireless devices and assigning each one of the wireless devices to one of the determined groups using unsupervised machine learning with the user network data and the cell network data as input, wherein each of the determined groups for the wireless devices represents a unique set of radio characteristics values;
detecting that a wireless device has entered the cell provided by the RANN; and
in response to detecting that the wireless device has entered the cell provided by the RANN, selecting one of the determined groups using supervised machine learning with user network data of said wireless device and the cell network data for the cell provided by the RANN as input and assigning the wireless device to the selected group.

2. The method according to claim 1, wherein the unsupervised machine learning comprises finding candidate groups describable by a weighted combination of multivariate Gaussian distributions of the user network data and the cell network data.

3. The method according to claim 1, wherein the unsupervised machine learning comprises at least one of the following steps:
selecting a number K of groups;
assigning repeatedly until convergence or for a fixed number of times, each one of the wireless devices to one of the groups by one or more of the following steps:
determining an assignment score for each wireless device for each group; and
determining adjusted properties of the groups based on the assignment score.

4. The method according to claim 1, wherein gap statistics is used to find which number of groups K to use for classifying the wireless devices.

5. The method according to claim 1, wherein the wireless devices are clustered and/or classified into five groups.

6. The method according to claim 1, wherein a Gaussian Mixture Model, GMM, is used during the unsupervised learning.

7. The method according to claim 1, wherein the supervised machine learning comprises at least one of the following steps:
learning a machine learning multi-class classification model using a training set of data to map the user network data to the correct group;
tuning parameters of the machine learning multi-class classification model using a validation set of data; and
determining a final correctness of the machine learning multi-class classification model using a testing set of data.

8. The method according to claim 1, wherein the supervised machine learning is based on constructing at least one decision tree.

9. The method according to claim 1, wherein Random Forest classification is used during the supervised learning.

10. The method according to claim 1, wherein the user network data comprises current user throughput, previous user throughput, channel quality indicator, CQI, rank, handover information, time to handover, or any combination thereof.

11. The method according to claim 1, wherein the cell network data comprises cell throughput, number of active wireless devices in the cell, number of wireless devices in queue of the cell, or any combination thereof.

12. The method according to claim 10, wherein the user network data comprises current user throughput, CQI, time to handover, and wherein the cell network data comprises cell throughput, and number of active users.

13. The method according to claim 1, wherein determining the groups comprises:
determining which user network data and which cell network data to use for classifying the wireless devices; and
assigning said each one of the wireless devices to one of the determined groups.

14. The method according to claim 1, further comprising:
acquiring auxiliary data such as time indication, wireless device identity information, wireless device group information, wireless device velocity information, speed information, radio access network node information, cell information, position information, or any combination thereof.

15. The method according to claim 14, further comprising:
scaling the auxiliary data so as to normalize all values of the auxiliary data.

16. The method according to claim 1, further comprising:
scaling the user network data and the cell network data so as to normalize all values of the user network data and the cell network data.

17. The method according to claim 15, further comprising:
adding an offset value to all normalized values.

18. The method according to claim 1, further comprising:
predicting, for wireless devices of one of the groups, into which other group said wireless devices of said one of the groups are most likely to enter.

19. The method according to claim 18, wherein Markov Chains are used during said predicting.

20. The method according to claim 1, wherein current user throughput is excluded from the user network data, the method further comprising:

predicting current user throughput for wireless devices of one of the groups.

21. The method according to claim 1, further comprising: determining a load balancing action for wireless devices of one of the groups with the user network data as input.

22. The method according to claim 1, further comprising: determining whether to perform carrier aggregation for wireless devices of one of the groups with the user network data as input.

23. A system for grouping wireless devices of a cell provided by a radio access network node, RANN, of a communications network, the system comprising processing circuitry, the processing circuitry being configured to cause the system to perform a set of operations comprising:
acquire user network data for wireless devices in the cell provided by the RANN and cell network data for the cell provided by the RANN;
determine groups of the wireless devices and assign each one of the wireless devices to one of the determined groups using unsupervised machine learning with the user network data and the cell network data as input, wherein each of the determined groups for the wireless devices represents a unique set of radio characteristics values;
detect that a wireless device has entered the cell provided by the RANN; and
in response to detecting that the wireless device has entered the cell provided by the RANN, select one of the determined groups using supervised machine learning with user network data of said wireless device and the cell network data for the cell provided by the RANN as input and assign the wireless device to the selected group.

24. The system according to claim 23, further comprising a storage medium storing said set of operations, and wherein the processing circuitry is configured to retrieve said set of operations from the storage medium to cause the system to perform said set of operations.

25. The system according to claim 23, wherein said set of operations is provided as a set of executable instructions.

26. A system for grouping wireless devices of a cell provided by a radio access network node, RANN, of a communications network, the system comprising:
processing circuitry; and
a computer program product comprising a non-transitory computer readable medium storing instructions that, when executed by the processing circuitry, causes the system to:
cause acquiring of user network data for wireless devices in the cell provided by the RANN and cell network data for the cell provided by the RANN;
cause determination of groups of the wireless devices and cause assignment of each one of the wireless devices to one of the determined groups using unsupervised machine learning with the user network data and the cell network data as input, wherein each of the determined groups for the wireless devices represents a unique set of radio characteristics values;
cause detection that a wireless device has entered the cell provided by the RANN; and
in response to detecting that the wireless device has entered the cell provided by the RANN, cause selecting one of the determined groups using supervised machine learning with user network data of said wireless device and the cell network data for the cell provided by the RANN as input and assigning the wireless device to the selected group.

27. A system for grouping wireless devices of a cell provided by a radio access network node, RANN, of a communications network, the system comprising one or more processors and a non-transitory computer readable memory coupled to said one or more processors, said one or more processors configured to:
acquire user network data for wireless devices in the cell provided by the RANN and cell network data for the cell provided by the RANN;
determine groups of the wireless devices and assigning each one of the wireless devices to one of the determined groups using unsupervised machine learning with the user network data and the cell network data as input wherein each of the determined groups for the wireless devices represents a unique set of radio characteristics values;
detect that a wireless device has entered the cell provided by the RANN; and
in response to detecting that the wireless device has entered the cell provided by the RANN, select one of the determined groups using supervised machine learning with user network data of said wireless device and the cell network data for the cell provided by the RANN as input and assign the wireless device to the selected group.

28. A computer program product comprising a non-transitory computer medium storing a computer program for grouping wireless devices of a cell provided by a radio access network node, RANN, of a communications network, the computer program comprising computer code which, when run on processing circuitry of a system, causes the system to:
acquire user network data for wireless devices in the cell provided by the RANN and cell network data for the cell provided by the RANN;
determine groups for the wireless devices and assign each one of the wireless devices to one of the determined groups using unsupervised machine learning with the user network data and the cell network data as input, wherein each of the determined groups for the wireless devices represents a unique set of radio characteristics values;
detect that a wireless device has entered the cell provided by the RANN; and
in response to detecting that the wireless device has entered the cell provided by the RANN, select one of the determined groups using supervised machine learning with user network data of said wireless device and the cell network data for the cell provided by the RANN as input and assign the wireless device to the selected group.

* * * * *